United States Patent
Shou et al.

(10) Patent No.: US 6,212,219 B1
(45) Date of Patent: Apr. 3, 2001

(54) SPREAD SPECTRUM COMMUNICATION SYSTEM

(75) Inventors: Guoliang Shou; Changming Zhou; Xuping Zhou; Makoto Yamamoto; Sunao Takatori, all of Tokyo (JP)

(73) Assignees: Yozan Inc., Tokyo; Sharp Kabushiki Kaisha, Osaka, both of (JP)

( * ) Notice: Subject to any disclaimer, the term of this patent is extended or adjusted under 35 U.S.C. 154(b) by 0 days.

(21) Appl. No.: 08/780,137

(22) Filed: Dec. 26, 1996

(30) Foreign Application Priority Data

Dec. 26, 1995 (JP) .................................. 7-351415
Jan. 23, 1996 (JP) .................................. 8-028467
Apr. 12, 1996 (JP) .................................. 8-114431

(51) Int. Cl.[7] .................................. H04L 27/30
(52) U.S. Cl. .................. 375/130; 375/140; 375/142; 375/143; 370/342
(58) Field of Search .................. 375/344, 367, 375/130, 140, 142, 143; 380/34; 370/342, 479, 209, 441

(56) References Cited

U.S. PATENT DOCUMENTS

| | | | |
|---|---|---|---|
| 5,063,571 | 11/1991 | Vancraeynest | 375/130 |
| 5,144,641 * | 9/1992 | Akazawa et al. | 375/200 |
| 5,291,515 * | 3/1994 | Uchida et al. | 375/200 |
| 5,530,697 * | 6/1996 | Watanable | 370/18 |
| 5,559,828 * | 9/1996 | Armstrong et al. | 375/117 |
| 5,583,884 * | 12/1996 | Maruyama et al. | 375/207 |

OTHER PUBLICATIONS

Sasaki et al, "Performance of Differential Parallel Combinatory Spread Spectrum Communication Systems," Electronics and Communications in Japan, Part 1, vol. 78, No. 10, 1995, pp. 73–84.

* cited by examiner

Primary Examiner—Stephen Chin
Assistant Examiner—Shuwang Liu
(74) Attorney, Agent, or Firm—Pillsbury Madison & Sutro LLP

(57) ABSTRACT

The present invention has an object to provide a spread spectrum communication system for heightening the speed of communication. The present invention transfers the first PN code sequence itself as the first component, adds and transfers zero or more instances of the second PN code sequence given a phase difference as the second component, and defines an information for transmitting by the number of the second PN codes corresponding to a cycle of said first PN code sequence.

20 Claims, 18 Drawing Sheets

FIG. 22

| n | R | Rn/Rq |
|---|---|---|
| 10 | 2 | 4.4 |
| 50 | 2 | 6.8 |
| 128 | 2 | 8.0 |
| 256 | 2 | 9.2 |
| 512 | 2 | 10.2 |
| 10 | 4 | 5.4 |
| 50 | 4 | 10.7 |
| 128 | 4 | 13.6 |
| 256 | 4 | 15.4 |
| 512 | 4 | 17.5 |

FIG. 23

| n | R | Rn/Rq |
|---|---|---|
| 10 | 4 | 6.6 |
| 50 | 4 | 11.5 |
| 128 | 4 | 14.3 |
| 256 | 4 | 16.2 |
| 512 | 4 | 18.3 |

SPREAD SPECTRUM COMMUNICATION SYSTEM

FIELD OF THE INVENTION

The present invention relates to a spread spectrum communication system.

BACKGROUND OF THE INVENTION

Spread spectrum communication systems spread the frequency spectrum of the transmitted signal by modulating the carrier with a spreading signal. This spreading signal is obtained by multiplying pseudonoise (PN) codes by the data being transmitted. The spectrum of the spreading signal approximates that of white noise, so the resulting transmitted signal has a wide bandwidth.

Many different PN codes may be used, and the correlation between these codes is usually limited. Therefore, a spread spectrum system is very secure against eavesdropping, has a high efficiency of frequency, and is very robust to noise. For these reasons, spread spectrum systems are expected to be the primary means of carrying mobile and personal communications and wireless LANs in the future.

For such applications, however, demand is growing for higher data capacities, more efficient use of bandwidth, and faster data transfer than conventional spread spectrum techniques can provide. The present invention extends spread spectrum technology to allow systems with higher rates of data transmission.

The outline of the transmitter of a spread spectrum (SS) communication system using quadrature phase-shift keying (QPSK) modulation is shown in FIG. 26. In the figure, 102 and 105 are binary phase-shift keying (BPSK) modulators, 107 is a PN code generator (PN.G) for generating PN code sequences, and 108 is a phase shifter for shifting the phase of a carrier wave by $\pi/2$.

Data generated by a data generating portion (DATA1) 100 are added to a PN code generated by PN.G 107 in an adder 101. Data generated by a data generating portion (DATA2) 103 are added to a PN code generated by the PN.G 107. In this case, one complete cycle of PN code is used to encode each bit of the data. The addition performed in adders 101 and 104 is modulo 2, that is, a PN code is outputted as is when the data bit is 0, and the PN code is inverted and outputted when the data bit is 1.

An output of an adder 101 is inputted to a BPSK modulator 102, and a carrier wave generated by a carrier wave oscillator 109 is modulated by BPSK. An output of an adder 104 is inputted to a BPSK modulator 105, and a carrier wave is modulated by BPSK, which wave is generated by a carrier wave oscillator 109 and is shifted in phase by $\pi/2$ by a phase shifter 108. An in-phase component of QPSK modulation (component I, hereinafter) can be obtained from a BPSK modulator 102, and an quadrature component of QPSK modulation (component Q, hereinafter) can be obtained from a BPSK modulator 105. These two components of BPSK modulation are added in an adder 106 to create a QPSK modulated signal. The QPSK modulated signal is transmitted from antenna 110. In this way, a multiplexed spread spectrum QPSK signal is transmitted from the transmitter portion.

The structure of the receiver is not shown. When a spread spectrum multisignal is received, it is divided into components I and Q, and both components of data are demodulated by correlation calculation of the received signal with the same PN code as was used on the transmission side. The data encoded by an inverted PN code causes a negative correlative output, and the data encoded by a noninverted PN code causes a positive correlative output.

SUMMARY OF THE INVENTION

Although a conventional spread spectrum communication system has confidentiality and high efficiency of frequency and is also robust against noise, data transmission capacity is small because an entire cycle of PN code is used to encode each bit of data to be transmitted. Also, the utility efficiency of a frequency is low because the frequency band of transmission is extremely wide due to the spreading of the spectrum.

The object of the present invention is to provide a spread spectrum communication system that improves both the data transmission capacity and the communication speed.

A spread spectrum communication system according to the present invention expresses the data to be sent by the phase difference between the first and the second components.

The present invention transmits the first PN code sequence itself as the first component, transmits an integrated signal of zero or more instances of the second PN code sequence with phase differences as the second component, and defines an information for transmittal by the number of instances of the second PN code corresponding to a cycle of the first PN code sequence.

A spread spectrum communication system according to the present invention performs as follows in order to achieve the above object.

In a spread spectrum communication system for transmitting data by multiplexing a first PN code sequence with a second PN code sequence having the same cycle as the first one, the second PN code sequence is generated by adding the predetermined number of basic PN code sequences shifted in phase, and a transmission information is defined by combinations of the predetermined number of basic PN code sequences for a reference phase of the first PN code sequence.

Also, in a spread spectrum communication system as above, a polarity of the first PN code sequence is controlled according to a predetermined bit of an information to be transmitted.

Further, a polarity of each basic PN code sequence of the second PN code sequence is determined according to a plurality of predetermined bits of information to be transmitted.

Furthermore, the first and the second PN code sequences are generated by a single PN code generating means.

Moreover, each of the first and second PN code sequences are transmitted by carrier waves different from each other.

In the spread spectrum communication system with two components according to the present invention, the first component consists of the first PN code sequence and the second component consists of an addition of a plurality of PN code sequences shifted in phase. An information is defined by shifted phases of the PN code sequences of the second component in comparison with the first component.

With these methods, it is possible to improve the capacity and speed of the data transmission.

Hereinafter an embodiment of the present invention using QPSK modulation is described with reference to the attached drawings.

BRIEF DESCRIPTION OF THE DRAWINGS

FIG. 22 is a table showing the relationship of the information rate ratios with respect to the number of chips and the number of peaks of the component Q.

FIG. 23 is a table showing the relationship of the information rate ratios when the number of the peaks of the component Q is four.

PREFERRED EMBODIMENT OF THE PRESENT INVENTION

Figure 1:
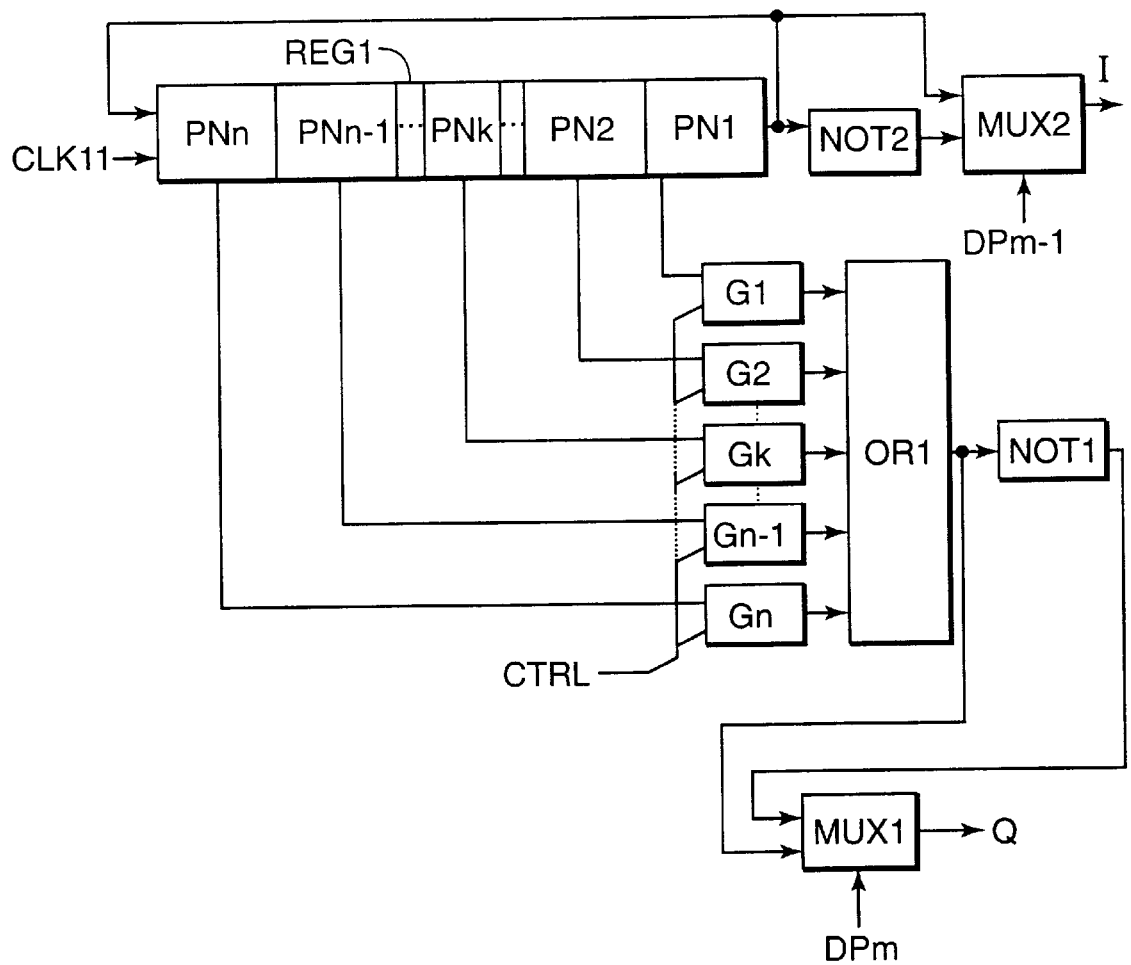
FIG. 1 is a block diagram showing an embodiment used in the present invention.

In FIG. 1, a PN code for spreading the spectrum is stored in a shift register REG1. The PN code itself or its inversion is transmitted as a component I. Therefore, the component I carries an information of 1 bit. Each stage of the shift register REG1 is connected to the respective gates G1 to Gn which are controlled by a control signal CTRL. The signal CTRL opens one of the gates G1 to Gn and a PN code which is a phase-shifted version of the PN code sequence stored in the shift register passes through it. (In FIG. 1, the PN code PN1 passes through the last stage of the shift register, and codes PN2 to PNn successively pass through the stage before the last stage to the first stage.) The gates G1 to Gn are connected to the stages of the shift register, from the last stage to the first stage, respectively. That is, when a gate Gk is opened, the k-th PN code from the last (PNk, in FIG. 1) passes through the gate. The PN code passes through the gate and through a OR circuit OR1, is appropriately inverted by a NOT gate, and is transmitted as a component Q (a quadrature component of the QPSK).

Figure 2:
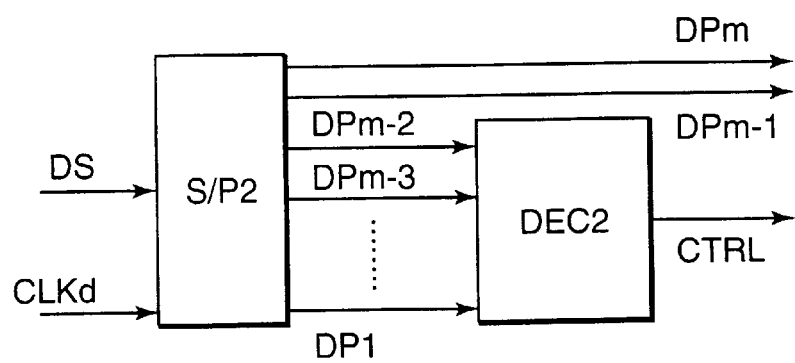
FIG. 2 is a block diagram showing a circuit performing conversion of data for transferring to the system in FIG. 1.

The component Q is a PN code or its inversion. The system of the present invention having a phase difference of the component I transmits the phase difference, inversion and non-inversion of the I and Q as information. As shown in FIG. 2, a serial data for transmission is transferred into m-bit parallel data DP1 to DPm (where m is a whole number not greater than $\log_2(4n)$) by a serial/parallel conversion circuit S/P2 synchronously to the predetermined clock CLKd. Bits DP1 to DPm-2 are inputted to a decoder DEC2, and the control signal CTRL is generated by the decoder.

When the value expressed by binary numbers DP1 to DPm-2 is p, CTRL is settled so that only the gate Gp is opened among the gates G1 to Gn. The bit DPm decides whether a signal inverted by the NOT gate (NOT1) corresponding to an component Q is valid or not, and the bit DPm-1 decides whether a signal inverted by the NOT gate (NOT2) corresponding to a component I is valid or not. The input and output signals of NOT1 are inputted to a multiplexer MUX1 and those of NOT2 are inputted to a multiplexer MUX2. The bit DPm is a control signal of MUX1 and the bit DPm-1 is a control signal of MUX2. The DPm and DPm-1 select a signal before or after inversion; for example, when DPm and DPm-1 are "1", they select an inverted signal, and when DPm and DPm-1 are "0", they select a non-inverted signal.

Figure 3:
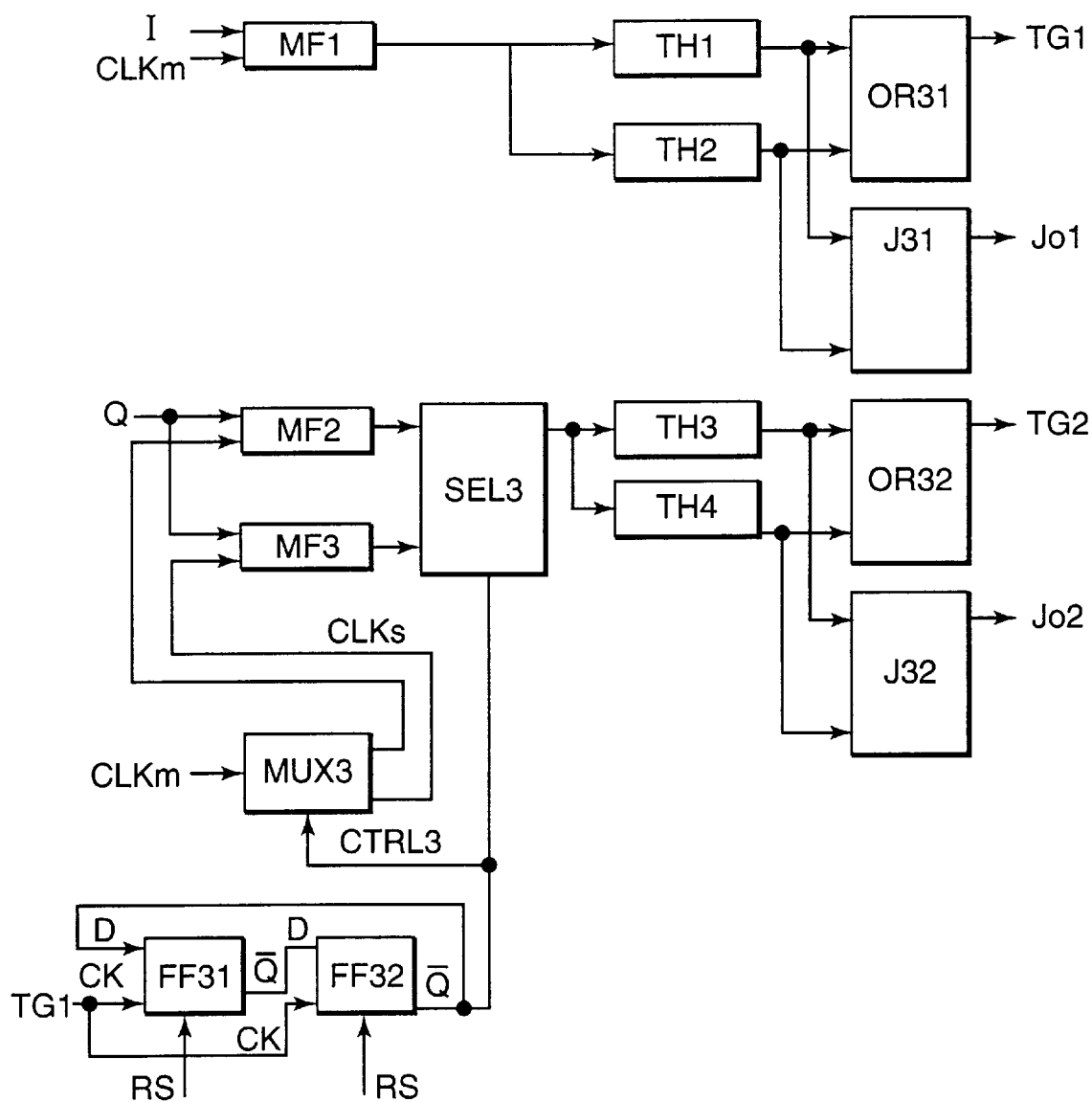
FIG. 3 is a block diagram showing an embodiment of a receiving system used in the present system.

FIG. 3 shows a receiving system of the present system. A matched filter MF1 for receiving an component I and matched filters MF2 and MF3 for receiving an component Q are included. The bits PN1 to PNn of the PN code sequence are settled as multipliers in the matched filter MF1. When a PN code of the component I and the multipliers of MF1 are aligned, MF1 generates a positive or negative peak. The output of MF1 is inputted to peak detecting circuits TH1 and TH2. A positive (non-inverted) peak is detected by TH1 and a negative (inverted) peak is detected by TH2. The outputs of TH1 and TH2 are inputted to OR circuit OR31, and a trigger signal TG1 is pulsed when one of them detects a peak. Outputs of TH1 and TH2 are also inputted to a judgment circuit J31. When TH1 does not detect a peak and TH2 detects a peak, the J31 generates a high level output Jo1. Jo1 becomes low-level in other cases. The level of Jo1 corresponds to the bit DPm-1 in FIG. 2.

Data is also inputted to either MF2 or MF3. The matched filter MF2 or MF3 to which the component Q is inputted stops inputting the component Q when the signal TG1 is outputted, and the other matched filter MF3 or MF2 starts inputting the component Q. The matched filter that stopped inputting the component Q circulates the PN code sequence and calculates the phase difference until a peak is generated by the portion of the component Q that was inputted.

A main clock CLKm is inputted to the MF1 for providing timing for inputting data. A sub-clock CLKs is alternately inputted to MF2 and MF3.

Figure 4:
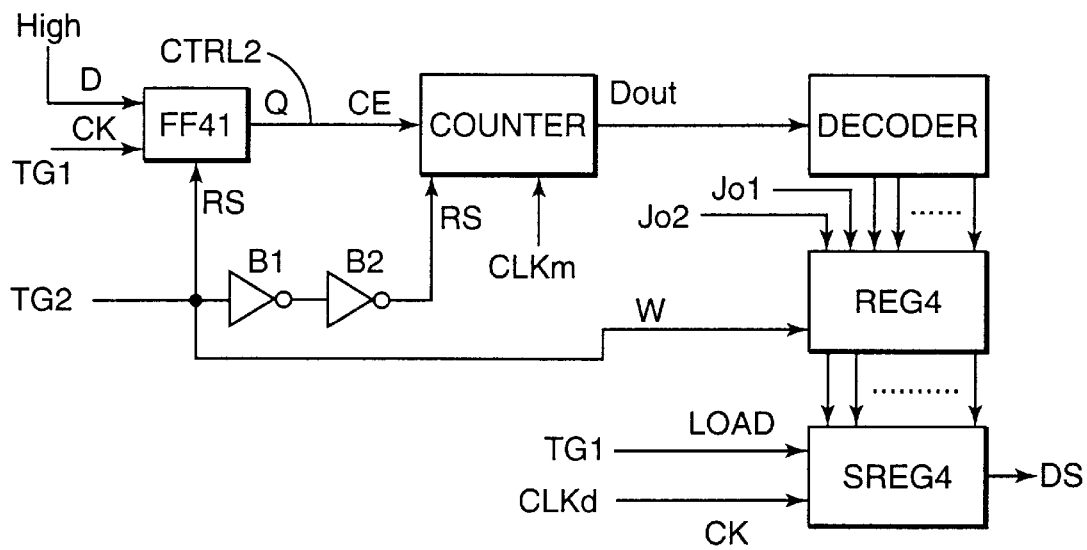
FIG. 4 is a block diagram showing a system for converting an output of the system in FIG. 3 into serial data.

In FIG. 4, TG1 is inputted to clock input CK of a flip-flop FF41. The high level input (shown by "High") connected to a data input (D) of FF41 is outputted as a high level signal from a non-inverted output of FF41 (Q). This signal is used as a control signal CTRL2. CTRL2 is inputted to a chip enable (CE) of a counter (shown by COUNTER), which begins counting when a pulse is generated on TG1. The main clock CLKm is also inputted to the counter, and the counter counts CLKm pulses after a pulse is generated on TG1.

As shown in FIG. 3, the main clock CLKm is inputted to a multiplexer MUX3 which selects MF2 or MF3. CLKs is generated as an output of MUX3, and is inputted to MF2 or MF3 by MUX3. Only the matched filter to which CLKs is inputted receives the data of the component Q. The MUX3 is controlled by a control signal CTRL3 which is inverted every time a TG1 pulse is inputted to two stages of flip-flops FF31 and FF32. TG1 is inputted to the clock input of FF31 (CK), and an inverted output of FF32 ($\overline{Q}$) is inputted to the data input of FF31 (D).

An inverted output of FF31 ($\overline{Q}$) is inputted to a data input of FF32 (D), and TG1 is inputted to a clock input of FF32 (CK). Therefore, an output of FF32 becomes alternately high level and low level every time a pulse is generated on TG1.

When a pulse appears on TG1 and CLKs has been inputted to MF2 until that time, MUX3 is switched to supply CLKs to MF3. The PN code is then circulated with respect to MF2. A selector SEL3 is switched by CTRL3 to select the output of MF2 when a pulse appears on TG1. An output of SEL3 is inputted to peak detecting circuits TH3 and TH4. A positive (non-inverted) peak is detected by TH3, and a negative (inverted) peak is detected by TH4. Outputs of TH3 and TH4 are inputted to an OR circuit OR32. When one of them detects a peak, a pulse is outputted on trigger signal TG2. Outputs of TH3 and TH4 are also inputted to a judgment circuit J32. When TH3 does not detect any peak and TH4 detects a peak, J32 generates a high level output Jo2. Jo2 is low level in other cases. The level of Jo2 corresponds to the bit DPm in FIG. 2.

As mentioned above, the period from the generation of a pulse on TG1 to the generation of a pulse on TG2 corresponds to the values DP1 to DPm-2. In FIG. 4, the COUNTER starts counting at the generation of a pulse on TG1 and stops at the generation of a pulse on TG2. TG2 is inputted to a reset input of FF41 (RS), and also to a reset input of the COUNTER (RS) through buffers B1 and B2. The COUNTER is returned to the initial state after counting the number of CLKm pulses up to the generation of a pulse on TG2. An output of the COUNTER is inputted to a decoder (shown by DECODER) and converted into DP1 to DPm-2 of the binary value corresponding to the period between pulses on TG1 and TG2. The converted value is inputted to a register REG4 with the Jo1 and Jo2. REG4 inputs them synchronously by TG2. The input value is stored until the generation of a pulse on TG1, and is then transferred to a shift register SREG4 which has the function of data loading, and to which TG1 is inputted at the load controlling input (LOAD). CLKd is always inputted to SREG4, and the transfer signal DS is outputted from it as a serial output of SREG4. Thus, a transferred signal is demodulated.

Figure 5:
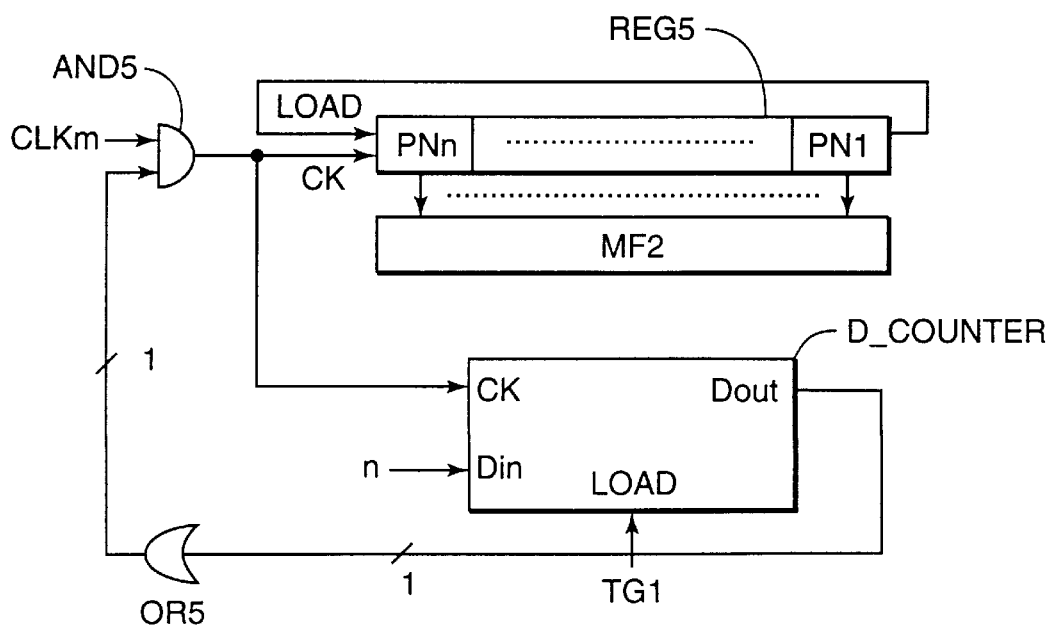
FIG. 5 is a block diagram showing a circuit for controlling a PN code of a matched filter for receiving a component Q.

As shown in FIG. 5, the bits PN1 to PNn are supplied from a shift register REG5. Peripheral circuits are omitted in FIG. 3. The data of the shift register starts circulating when a pulse on signal TG1 is generated. TG1 is inputted to a loading data controlling input (LOAD) of a down-counter (D_COUNTER), and n number of PN code bits is loaded. An f-bit binary output (where f is a whole number not less than $\log_2 n$) is inputted to a gate AND5 after integration by a gate OR5. A CLKm is also inputted to AND5. Therefore, AND5 is opened when the counter value of D_COUNTER is equal to or more than 1, and CLKm is then inputted to REG5.

When n number of CLKm pulses are inputted to the D_COUNTER after a pulse on TG1 is generated, the count value of the D_COUNTER is 0 and gate AND5 is closed. Therefore, the PN code circulates once, returns to the initial stage, and is ready for the next processing of the matched filter. On each processing, a phase difference between TG1 and TG2 is calculated by the COUNTER when a pulse on TG2 is generated. As the matched filter circulating a PN code cannot receive the new component Q, the matched filter supplies CLKs to the other matched filter (MF2 or MF3). As MF3 is structured similarly to MF2, the description is omitted.

Figure 6:
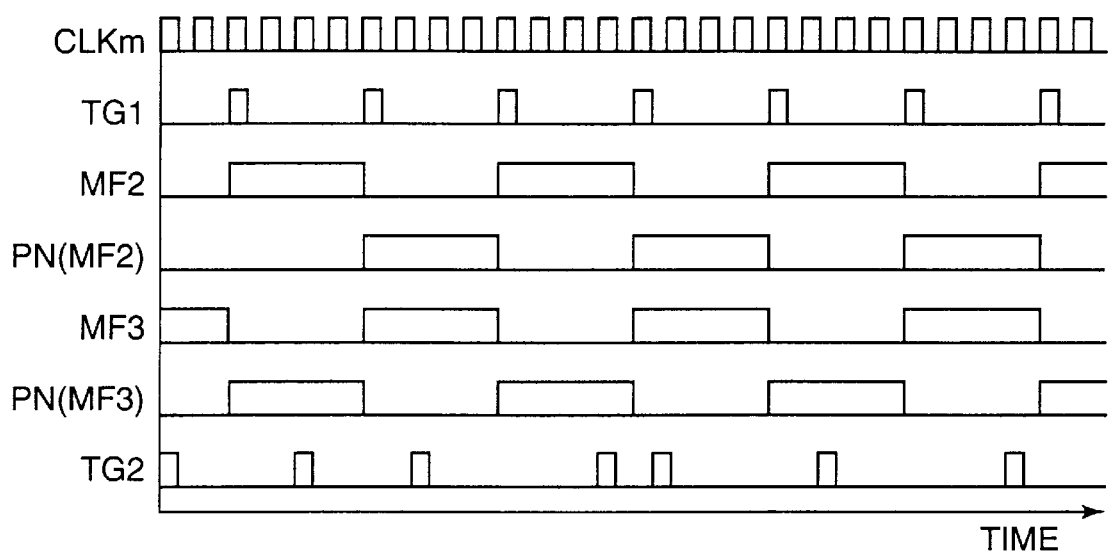
FIG. 6 is a timing chart of the receiving system.

FIG. 6 is an exemplary timing chart showing main clock CLKm, generation of TG1, data input by MF2 (shown by MF2), PN code circulation in MF2 (shown by PN(MF2)), data input by MF3 (shown by MF3), PN code circulation in MF3 (shown by PN(MF3)), and generation of TG2. Data is alternately inputted to MF2 and MF3 at the point when the signal TG1 is generated. Simultaneously, the matched filters MF2 and MF3 are switched with respect to the circulation of PN code.

As above, when the information to be transmitted is represented by a phase difference between peaks of components I and Q and inversion or non-inversion of a peak, the information rate Rn is as in formula (1) in the case where the spreading ratio is n.

$$Rn = \frac{\log_2(4n)}{n \cdot Tc} \tag{1}$$

Tc in formula (1) is a chip time. The information rate Rq is expressed in formula (2) in the case where each I and Q channel transfers a 1 bit information by conventional n chip (1 information symbol).

$$Rq = \frac{2}{n \cdot Tc} \tag{2}$$

The ratio of the two rates is shown in formula (3).

$$\frac{Rn}{Rq} = \frac{\log_2(4n)}{2} \tag{3}$$

TABLE 1 shows the results of calculations by replacing n in formula (3) with various numerical values. It shows that the quantity of information is increased several times in the new system as compared to a conventional one. It can be said that the speed of communication is heightened.

TABLE 1

| n | Rn/Rq |
|---|---|
| 10 | 2.5 |
| 50 | 3.5 |
| 128 | 4.5 |
| 256 | 5.0 |
| 512 | 5.5 |

Figure 28:
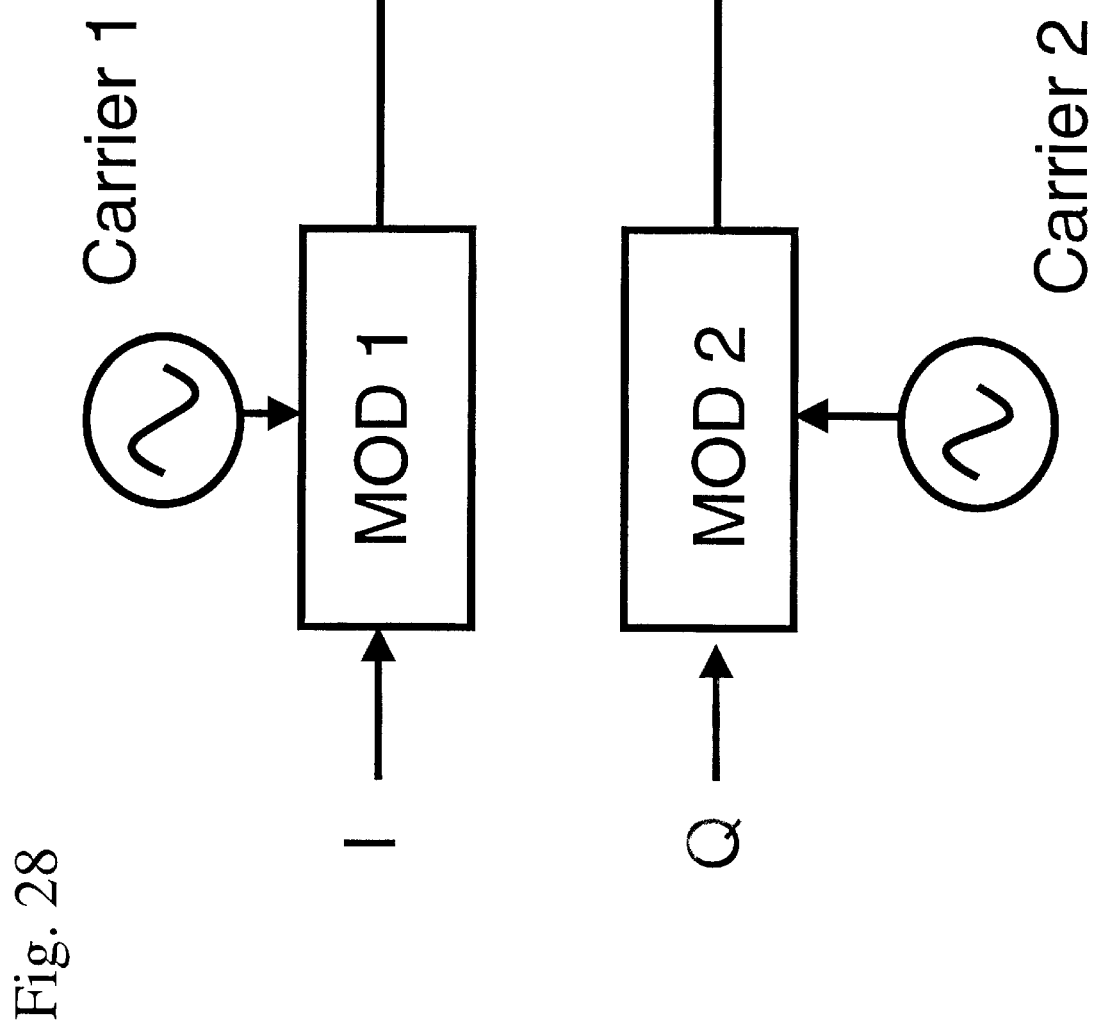
FIG. 28 is a block digram showing transmission of I and Q components by carrier waves different from each other.

In the above embodiment, the components I and Q consist of the same PN code sequence. However, it is also possible to give different PN code sequences to the I and Q components and to the matched filters MF2 and MF3. Also, it is possible to transfer and receive the first and second components of a communication system by a scheme other than QPSK, for example, by another channel transferred by a different carrier wave similar to the above embodiment, e.g. as illustrated in FIG. 28.

Hereinafter the second embodiment transferred by a carrier frequency of the spread spectrum communication system according to the present invention is described with reference to the attached drawings. The first components are in-phase (component I) and the second ones are orthogonal component Q).

Figure 7:
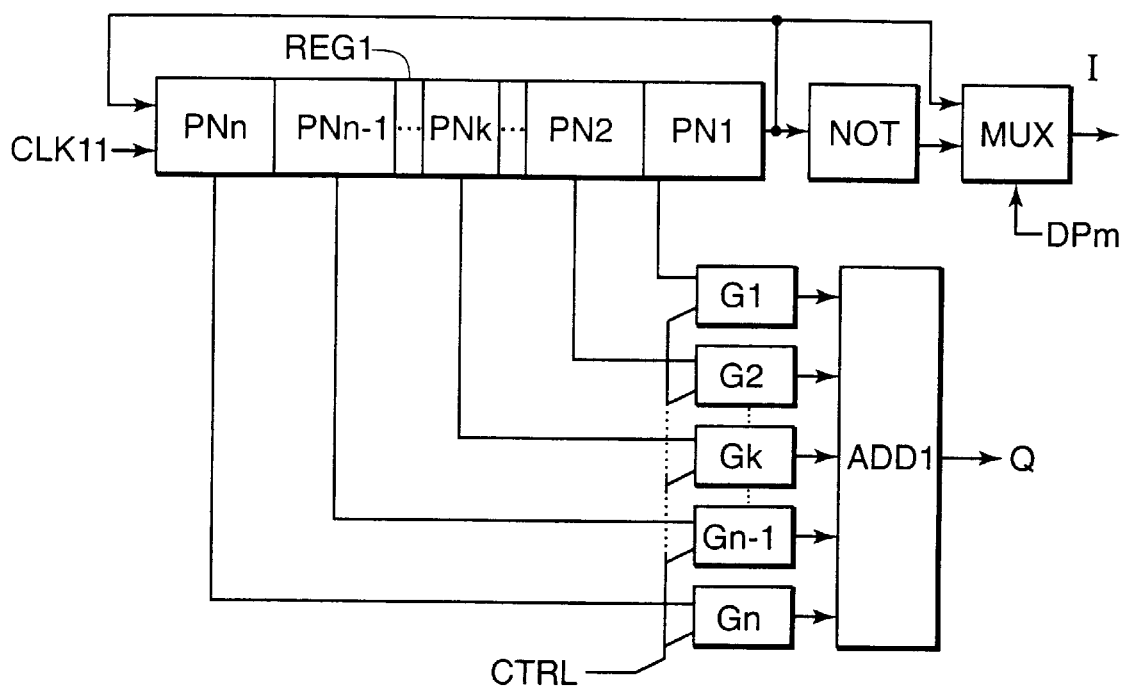
FIG. 7 is a block diagram showing the second embodiment used in the present invention.

In FIG.7, the PN code for spreading the spectrum is stored in a shift register REG1. The PN code itself or its inversion is transmitted as a component I by a carrier frequency (cos 2 πft) using BPSK modulation. Therefore, the component I carries an information of 1 bit. Each stage of the shift register REG1 is connected to the respective gates G1 to Gn which are controlled by a control signal CTRL to be opened and closed. The signal CTRL opens zero or more of the gates G1 to Gn, and zero or more phase-shifted versions of the PN code sequence stored in the shift register then pass through the gates. (In FIG. 7, the PN code PN1 passes through the last stage of the shift register and codes PN2 to PNn successively pass through the stage before the last stage to the first stage.) The gates G1 to Gn are connected to the stages of the shift register, from the last stage to the first stage, respectively. That is, when a gate Gk is opened, the k-th PN code from the last (PNk, in FIG. 7) passes through the gate. The PN codes that pass through the gates are added by an addition circuit ADD1, and transmitted as a component Q (an orthogonal component of the QPSK).

Figure 8:
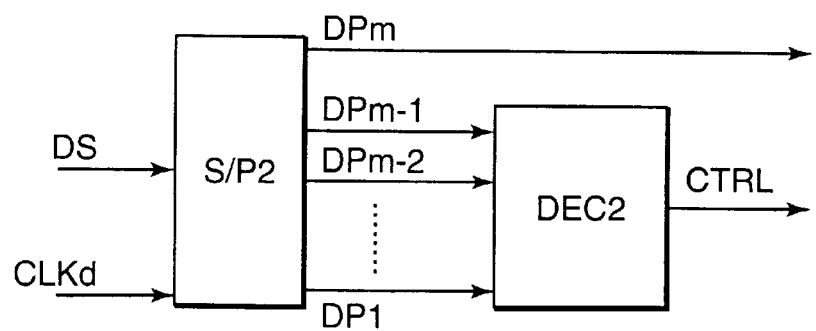
FIG. 8 is a block diagram showing a circuit performing conversion of data for transferring to the system in FIG. 7.

The component Q is an integrated signal of a plurality of PN code sequences of a number from zero to more than 2. In the present embodiment, the number of the PN code sequences of the component Q is transferred as an information. As shown in FIG. 8, a serial data to be transmitted is converted into parallel data DP1 to DPm of m bits by a serial/parallel conversion circuit S/P2 synchronously to the predetermined clock CLKd. The bits DP1 to DPm-1 are inputted to a decoder DEC2, and the control signal CTRL is generated in DEC2.

When the value expressed by binary numbers DPI to DPm-1 is p, CTRL is settled so that p number of gates are opened among the gates G1 to Gn.

An inverting circuit NOT is connected to the final stage of REG1.

An input and output of NOT are inputted to a multiplexer MUX. The DPm is a control signal of MUX which outputs NOT-output (inversion) when DPm is "1" and NOT-input (non-inversion) when it is "0".

Figure 9:
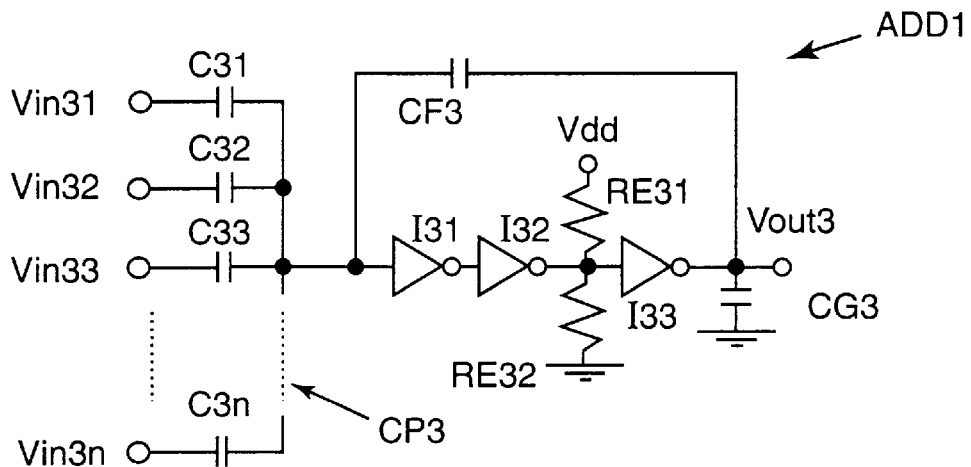
FIG. 9 shows the addition circuit of FIG. 7.

In FIG. 9, in an addition circuit ADD1, the input voltages Vin31 to Vin3n, which are the outputs from G1 to Gn, are integrated by a capacitive coupling CP3 consisting of capacitances C31 to C3n. An output of CP3 is inputted to an inverted amplifying circuit consisting of three stages of MOS inverters I31, I32 and I33. An output of I33 is fed back to an input of I31 through a feedback capacitance CF3. The inverted amplifying circuit outputs an output Vout3 in formula (4) with high linearity by forming a feedback system with sufficiently high open-loop gain. Outputs of G1 to Gn formed by "0" and "1" are added as "−1" and "+1", respectively. According to this scheme, "1 "+"1"=2, "1"+ "0"=0, and "0"+"0"=−2. The output Vout3 is an analog signal and a component Q of a baseband signal. This signal can be ternary-valued or more, and can be transferred to a communication route by amplitude-modulating a phase-shifted carrier frequency (sin 2 πft).

$$Vout3 = Vdd - \frac{\sum_{i=1}^{n} Vin3i \cdot C3i}{CF3} \quad (4)$$

In this formula, the C3i are defined as below.

$$C31 = C32 = \ldots = C3n = \frac{CF3}{n} \quad (5)$$

Therefore, formula (4) can be transformed into formula (6).

$$Vout3 = Vdd - \frac{1}{n}\sum_{i=1}^{n} Vin3i \quad (6)$$

The addition circuit outputs the voltage corresponding to the result of summing Vin31 through Vin3n. The output is transferred after scaling or other processing. When digital processing is desired, for example, a digital output can be generated by forming the above circuit with a well-known digital circuit.

Figure 10:
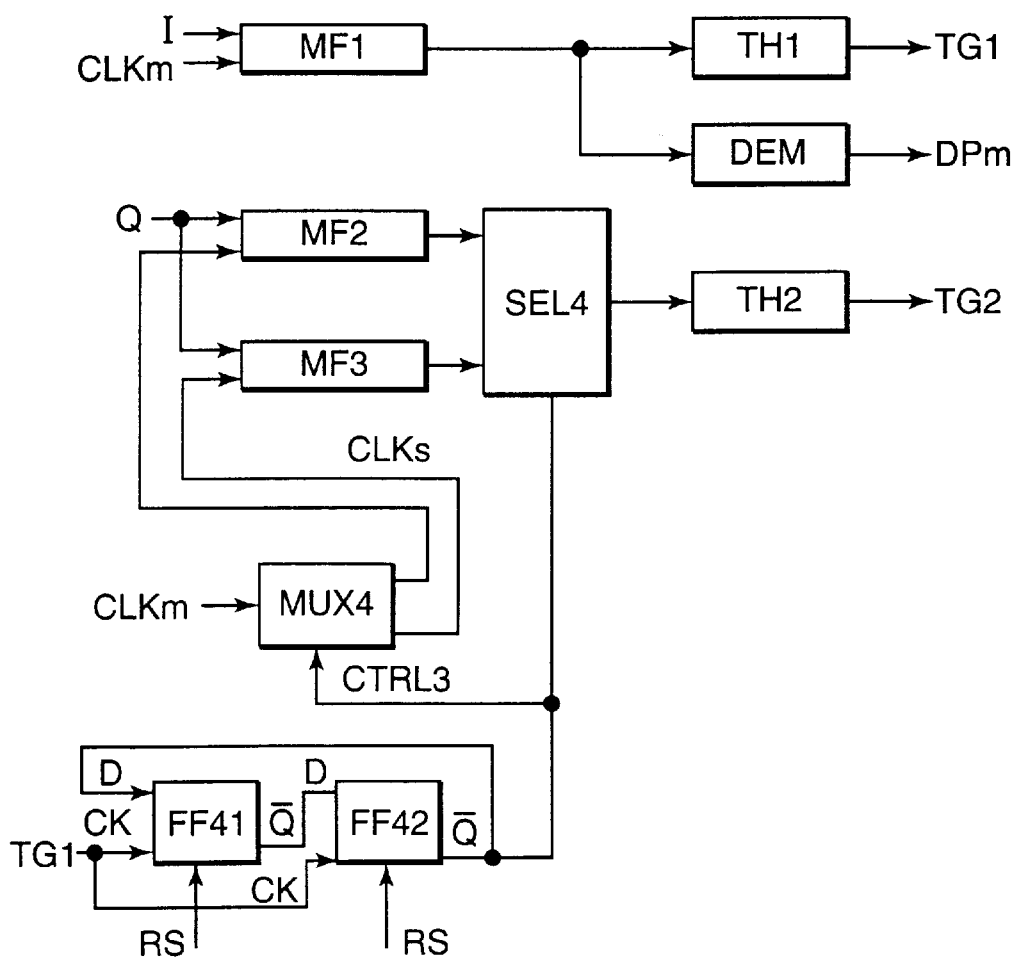
FIG. 10 is a block diagram of a receiving system used in the present system.

FIG. 10 shows a receiver system of the present system. A matched filter MF1 for receiving a component I and matched filters MF2 and MF3 for receiving a component Q are included. Bits PN1 to PNn of the PN code sequence are settled as multipliers in the matched filter MF1. When a PN code of the component I and the multipliers of MF1 are aligned, MF1 generates a peak. The peak is detected by a peak detecting circuit TH1, and a trigger signal TG1 is generated. The output of MF1 is also inputted to a demodulating circuit DEM, which judges whether the peak is positive or negative. The judgment signal is the bit DPm. When a negative peak is detected, DPm=1 is outputted and when a positive peak is detected, DPm=0 is outputted.

Data is also inputted to either MF2 or MF3. The matched filter MF2 or MF3 to which the component Q is inputted stops receiving the component Q when the signal TG1 is outputted, and the other matched filter MF3 or MF2 starts inputting the component Q. The matched filter which has stopped receiving the component Q circulates the PN code sequence and calculates the number of peaks in the portion of the component Q that was received.

As the same PN code is circulated in the matched filter which has stopped receiving an component Q, the system whose phase is matched successively generates peaks. When r number of PN code sequences (with PN code length of N) are transferred, r peaks are always generated as the sequences are circularly shifted through the matched filter N times. A pulse on signal TG2 is generated once on every peak. As the component Q including noise due to transmission is multivalued, the noise margin is outwardly not good. However, the noise can be canceled to some degree when a PN code sequence is detected because it is the signal generated by adding the PN code sequence.

A main clock CLKm is inputted to MF1 for providing timing for inputting data. A sub-clock CLKs is alternately inputted to MF2 and MF3.

Figure 11:
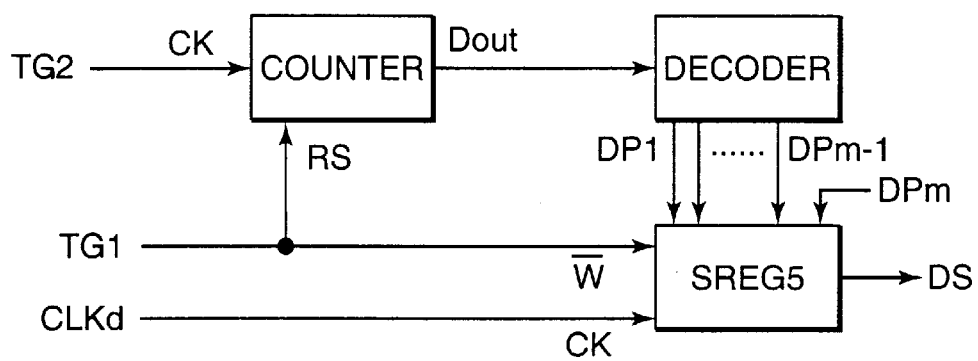
FIG. 11 is a block diagram showing a system for converting an output of the system in FIG. 9 into serial data.

In FIG. 11, TG1 is inputted to a reset input (RS) of a counter (shown by COUNTER), which begins counting when a pulse on TG1 is generated. A trigger signal TG2 which pulses when MF2 or MF3 generates a peak is inputted to a clock input of a counter (CK). The counter counts pulses of TG2 after a pulse on TG1 is generated.

As shown in FIG. 10, the main clock CLKm is inputted to a multiplexer MUX4 which selects MF2 or MF3. CLKs is generated as an output of MUX4, and is inputted to MF2 or MF3. Only the matched filter to which CLKs is inputted inputs the data of the component Q. MUX4 is controlled by a control signal CTRL3 which is inverted every time a TG1 pulse is inputted to two stages of flip-flops FF41 and FF42. TG1 is inputted to the clock input of FF41 (CK), and an inverted output of FF42 ($\overline{Q}$) is inputted to the data input of FF41 (D). An inverted output of FF41 ($\overline{Q}$) is inputted to a data input of FF42 (D), and TG1 is inputted to a clock input of FF42 (CK). Therefore, an output of FF42 becomes alternately high level and low level every time a TG1 pulse is inputted.

When a TG1 pulse is generated and CLKs has been inputted to the MF2 until that time, MUX4 is switched to supply CLKs to MF3. Then the PN code is circulated within MF2. A selector SEL4 is switched by CTRL3 to select the output of MF2 when a TG1 pulse is generated. An output of SEL4 is inputted to a peak detecting circuit TH2. When TH2 detects a peak, a pulse on a trigger signal TG2 is outputted.

As mentioned, the period from the generation of a TG1 pulse to the generation of TG2 pulses corresponds to the values DP1 to DPm-2. The COUNTER starts counting at the generation of a TG1 pulse and counts up at every generation of a TG2 pulse. An output of the COUNTER is inputted to a decoder (shown by DECODER) and converted into DP1 to DPm-1 of the binary value corresponding to the number of TG2 pulses. This converted value is inputted to a shift register SREG5, which inputs them synchronously by the generation of a TG1 pulse. The clock CLKd is inputted to SREG5, and the value inputted to SREG5 is outputted as a serial output of SREG5. The serial output is the transferred signal DS, and thus a transferred signal is demodulated.

As shown in FIG. 5, the bits PN1 to PNn are supplied to MF2 from a shift register REG5. The data of the shift register starts circulating when a TG1 pulse is generated. TG1 is inputted to a loading data controlling input (LOAD) of a down-counter (D_COUNTER), and n number of PN code bits are loaded. An f-bit binary output is inputted to a gate AND5 after integration by a gate OR5. A CLKm is also inputted to AND5. Therefore, AND5 is opened when the counter value of D_COUNTER is equal to or more than 1 and CLKm passes through AND5. The number of bits f is the value calculated by formula (7) corresponding to the number n.

$$\log_2 n \leq f < \log_2 n + 1 \tag{7}$$

When n number of CLKm pulses are inputted to the D_COUNTER after a TG1 pulse is generated, the count value of the D_COUNTER is "0" and gate AND5 is closed. Therefore, the PN code circulates once, returns to the initial stage, and is ready for the next processing of the matched filter. On each processing, the number of TG2 pulses generated is counted by the COUNTER. As the matched filter circulating a PN code cannot receive the new component Q, MUX4 supplies CLKs to the other matched filter (MF2 or MF3). As MF3 is structured similarly to MF2, the description is omitted.

Figure 12:
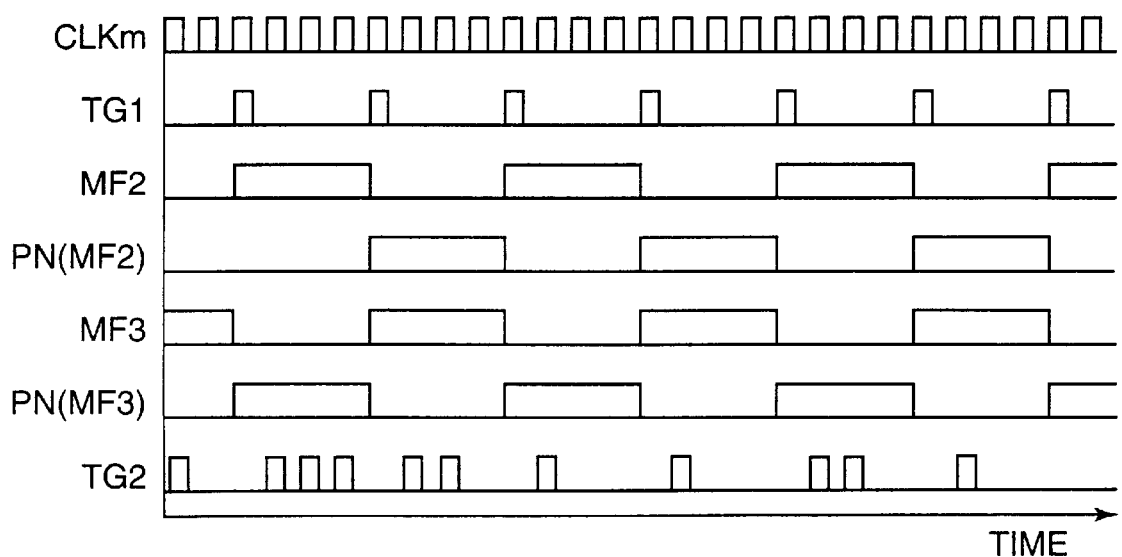
FIG. 12 is a timing chart of the receiving system.

FIG. 12 is an exemplary timing chart of main clock CLKm, generation of TG1, data input by MF2 (shown by MF2), PN code circulation in MF2 (shown by PN(MF2)), data input by MF3 (shown by MF3), PN code circulation in MF3 (shown by PN(MF3)), and generation of TG2. Data is alternately inputted to MF2 and MF3 at the point when a TG1 pulse is generated. Simultaneously, the circulation of PN code ends in one of the component Q matched filters and begins in the other.

As above, when the information to be transmitted is replaced by a phase difference of a peak of components I and Q, and inversion and non-inversion of the component I, the information rate Rn is as in formula (8) in the case where the spreading ratio is n.

$$Rn = \frac{\log_2 2n}{n \cdot Tc} \tag{8}$$

Tc in formula (8) is a chip time. The information rate Rq is expressed in formula (2) in the case where each I and Q channel transfers a 1 bit information by conventional n chip using QPSK to transfer two orthogonal components. The ratio of the two rates is shown in formula (9).

$$\frac{Rn}{Rq} = \frac{\log_2 2n}{2} \tag{9}$$

TABLE 2 shows the results of calculations by replacing n in formula (2) with various numerical values. It shows that the quantity of information is increased several times in the new system as compared to a conventional one. It can be said that the speed of communication is heightened.

TABLE 2

| n | Rn/Rq |
| --- | --- |
| 10 | 2.1 |
| 50 | 3.3 |
| 128 | 4.0 |
| 256 | 4.5 |
| 512 | 5.0 |

In the above embodiment, the components I and Q consist of the same PN code sequence. However, it is also possible to give different PN code sequences to I and Q components and to the matched filters MF2 and MF3. Also, it is possible to transfer and receive the first and second components of a communication system by a scheme other than the transfer of two orthogonal components, for example, by another channel transferred by a different carrier frequency similar to the above embodiment, e.g. as illustrated in FIG. 28. More information can also be transferred by inverting the peak of the component Q (the second component) in the embodiment.

Figure 13:
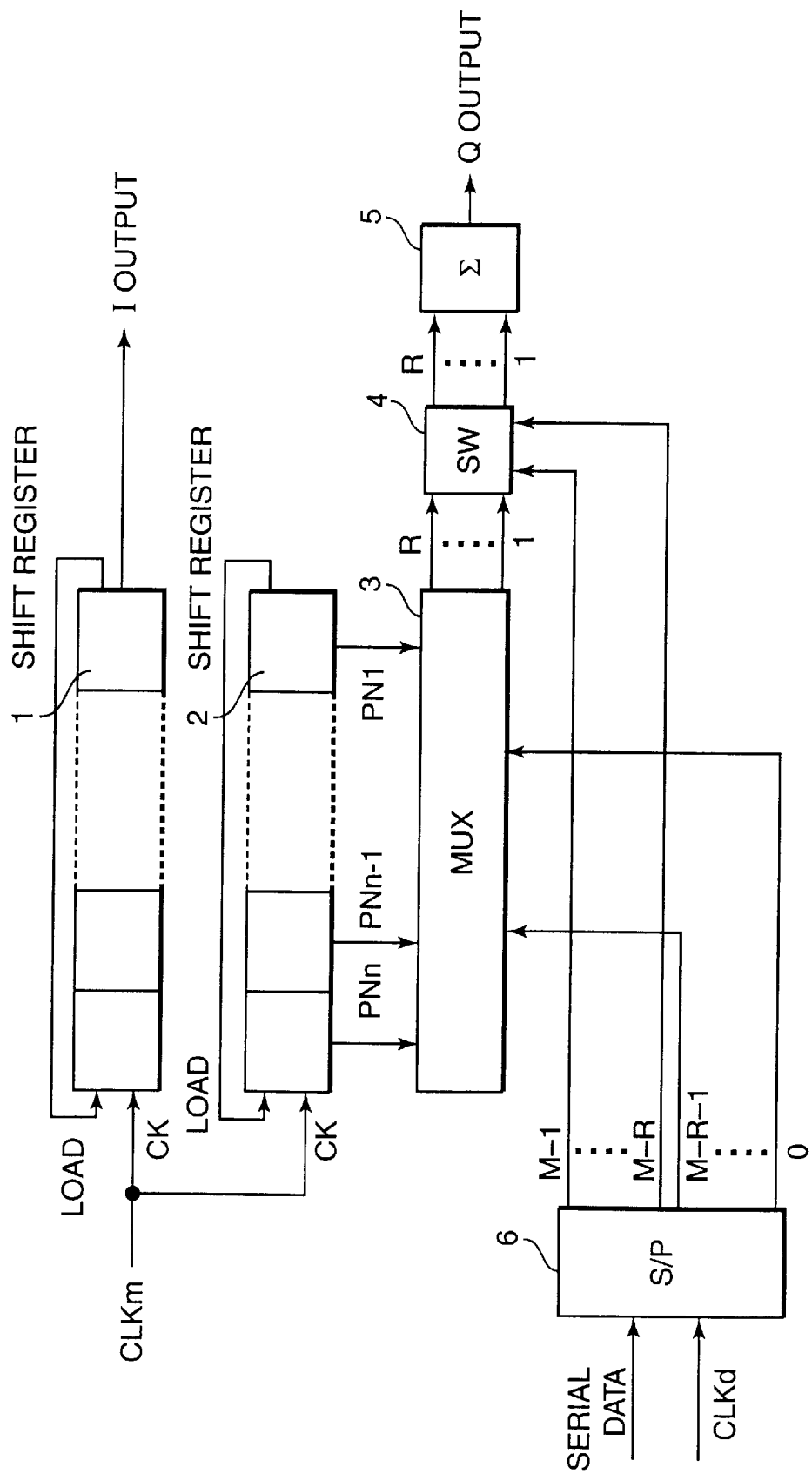
FIG. 13 is a block diagram of the structure of a transmitting portion of the third embodiment of a spread spectrum communication system of the present invention.

FIG. 13 shows the third embodiment of a transmitting portion of a spread spectrum communication system (SS) according to the present invention. The SS communication system uses quadrature amplitude modulation (QAM). In FIG. 13, the structure up to the baseband modulation before the QAM is shown.

In FIG. 13, 1 and 2 are shift registers having feedback routes. The stored PN code sequence is shifted at every pulse of a clock CLKm and circulates in the shift register.

Although the PN code sequences circulating in the shift register 1 and the shift register 2 can be different from each other, the number of chips in the PN code sequences, that is, the period of the cycle of each PN code sequence, must be the same. The PN code sequence outputted from the shift register 1 becomes an input data of the component I when QAM is performed.

Outputs PN1 to PNn of each stage of the shift register 2 are inputted to a multiplexer (MUX). The outputs PN1 to PNn are phase-shifted PN code sequences. The correlation is very small because of the phase offsets.

(M-R) bits of data are inputted to the select inputs of MUX. The PN code sequences PN1 to PNn inputted to the data inputs of MUX are combined by two or more and outputted from MUX according to the (M-R)-bit input data. The number of PN code sequences outputted by MUX is R.

The R PN code sequences outputted by MUX are inputted to a switch portion 4. R bits of input data are also inputted to the switch portion 4. According to the R bits of input data, the polarities of the R PN code sequences supplied by MUX are controlled. For example, a PN code sequence is outputted without inversion by a "0" bit, and it is outputted after inversion by a "1" bit.

The R PN code sequences controlled in such a way are outputted by adding all the PN code sequences by an addition circuit 5. The addition output becomes an input data when QAM is performed.

The input data for transmittal by a transmitting portion is inputted to serial/parallel converter 6 as serial data and converted into parallel data, whose one block is M bits wide, by the timing of a data clock CLKd. The parallel data of M bit width is then divided into R bits and (M-R) bits. The data of (M-R) bits are supplied to the MUX as controlling data, and the other R bits are supplied to the switch portion 4 as controlling data.

The information transmission rate of data in the transmitting portion is as follows.

As R PN code sequences are selected from N PN code sequences PN1 to PNN, $_NC_R$ combinations can be transmitted. Also, as R polarities of PN code sequences are controlled, $2^R$ combinations can be transmitted. Therefore, the transmissible number of bits is as in formula (10).

$$\log_2(2^R \cdot {}_NC_R)[\text{bit}] \quad (10)$$

The information transmission rate $R_N$ is as in formula (11) assuming the number of chips of the PN code sequences is N.

$$R_N = \{\log_2(2^R \cdot {}_NC_R)\}/N[\text{bit/symbol}] \quad (11)$$

The number of bits transmissible by one cycle of PN code sequence is 1 bit by the phase I, and 1 bit by the phase Q. As the transference rate $R_O$ is 2/N, the present invention can remarkably improve the information transmission rate.

For example, assuming that N=128 and R=2, the conventional transmission rate $R_O$ is 1/64, and the transmission rate $R_N$ by the present invention is approximately 15/128. The speed of the present invention is approximately 7.5 times as fast as the conventional one. When N is 85, the speed of transmission rate is about 12,928 times as fast as the conventional one.

In the SS communication system of the present invention, a plurality of PN code sequences are combined according to an information to be transmitted. This system improves the capacity of transmissible data, and further improves the capacity of data by controlling the polarity of combined PN code sequences according to the data to transmit.

In this case, on the receiving side, a plurality of correlational peaks of the number of PN code sequences combined by the components Q can be obtained. The transferring data is decoded by the locations of the plurality of correlational peaks. Therefore, the reference phase of the locations of the peak is necessary and is obtained by transferring the PN code sequence outputted from the shift register 1 by the component I.

Figure 14:
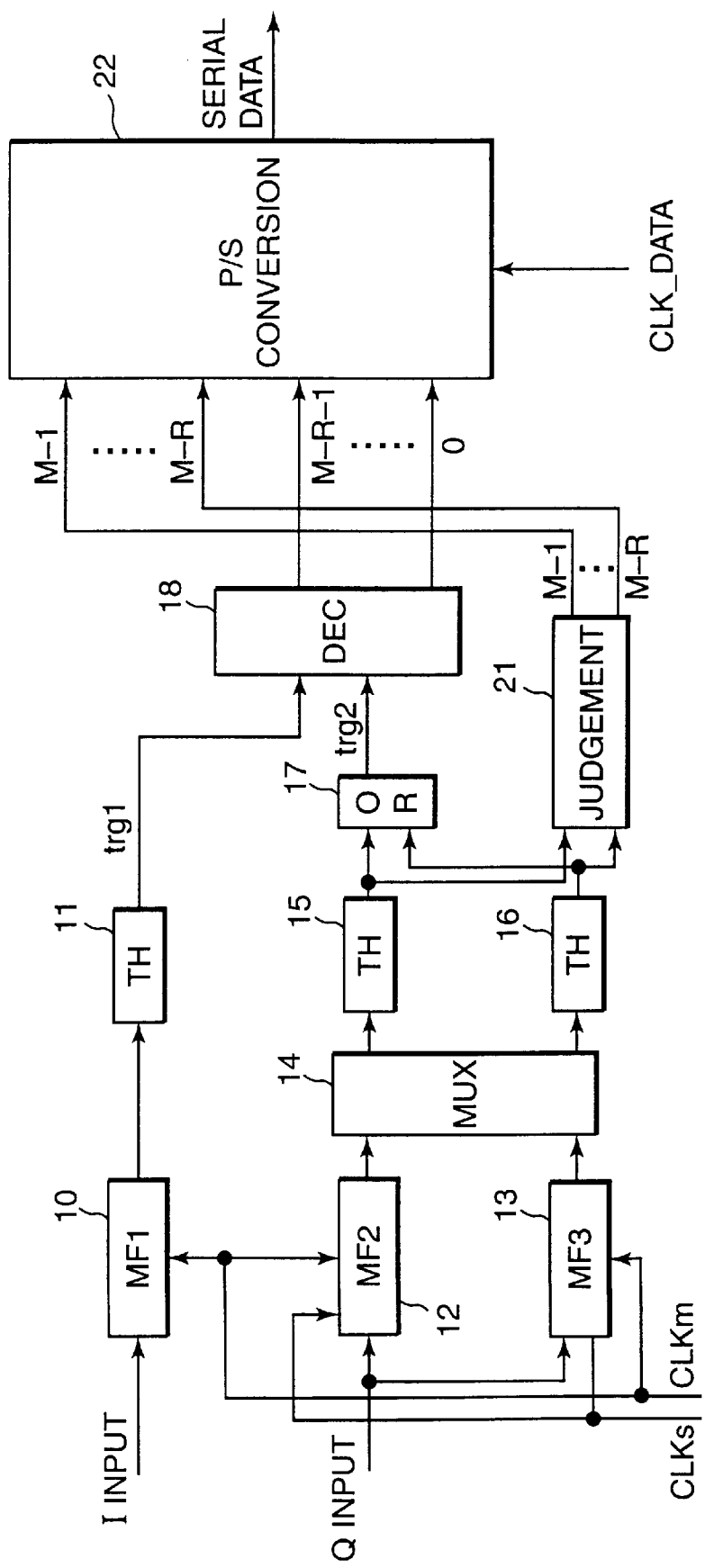
FIG. 14 is a block diagram of the structure of a receiving portion of the third embodiment of a spread spectrum communication system of the present invention.

FIG. 14 shows an exemplary construction of the receiver side of the SS communication system according to the present invention.

In FIG. 14, the signal I of the in-phase component for obtaining the reference phase and the signal Q of the quadrature component modulated from the transferring data are obtained by demodulation and division of the QAM signal.

The signal I is inputted to a matched filter (MF1) 10 and a correlation is calculated. In this case the PN code sequence stored in a shift register 1 of a transmitting portion is settled as a multiplier.

In the matched filter 10, a correlation peak is outputted when a correlation is calculated between a multiplier, to which a signal I is inputted on every pulse of clock CLKm and circulated, and the signal I. The correlation peak is detected by a peak detecting circuit (TH) 11. The detecting signal is supplied to a decoder (DEC) 18 as the first trigger signal (trg1) and (M-R) bits are decoded by the decoder 18.

A signal Q is alternately inputted to a matched filter (MF2) 12 and a matched filter (MF3) 13, and a correlation with a PN code sequence is alternately calculated. In this case, a PN code sequence stored in the shift register 2 in the transmitting portion is settled in the matched filters 12 and 13 as a multiplier and circulated.

When the signal Q is inputted to the matched filter 12, the PN code sequence in the matched filter 13 is circulated and a correlation is calculated. When the signal Q is inputted to the matched filter 13, a correlation is calculated by the matched filter 12. In this way the signal Q is alternately inputted to and a correlation is calculated by the matched filters 12 and 13. A clock CLKs for providing timing for alternately inputting the signal Q and the clock CLKm for circulating the PN code sequence are inputted to the matched filters 12 and 13.

The correlation output calculated by matched filters 12 and 13 is selectively outputted from a multiplexer (MUX) 14. A positive correlation peak of a correlation output from the MUX 14 is detected by a peak detecting circuit 15, and a negative correlation peak is detected by a peak detecting circuit 16. The peaks are inputted to a OR circuit 17 and a judgment circuit 21. A correlation peak output compounded by the OR circuit 17 is inputted to the decoder 18 as the second trigger (trg2). The decoder 18 decodes a location in time of R pulses of trg2 against the reference trg1, and a decoded data of (M-R) bits is obtained. The decoded data is inputted to a P/S converter 22 as bits 0 through (M-R-1).

In a judging circuit 21, the polarity of the correlation peak detected by the peak detecting circuits 15 and 16 is judged, and R number of data bits are decoded "0" or "1" according to the polarities of the R number of correlation peaks detected within the correlation in one cycle of the PN code sequence. R decoded data bits are inputted to the P/S converter 22 as bits (M-R) through (M-1).

The M bits of data from bit 0 to bit (M-1) which are thus inputted to the P/S converter 22 are converted into serial data and outputted. The converting timing in this case depends on the data clock CLKd.

The receiving portion of the SS communication system of the present invention obtains a plurality of correlation peaks in a period of the PN code sequence, decodes transmission data according to the number and timing of the peaks, and decodes transmitted data according to the polarity of each correlation peak. Thus the data transmitted at the transmitting rate expressed by the formula (11) is decoded.

The fourth embodiment of a SS communication system according to the present invention is described with reference to FIGS. 15 and 22.

Figure 15:
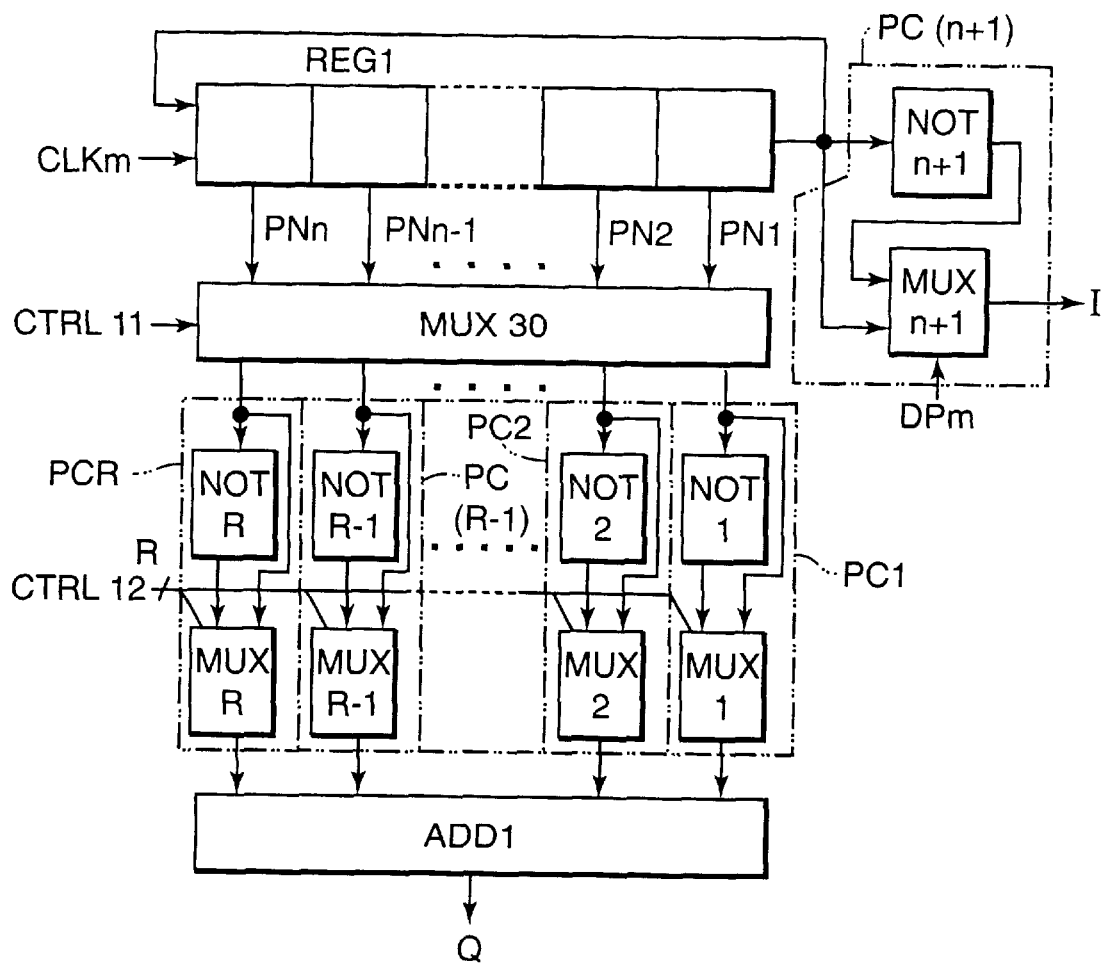
FIG. 15 is a block diagram of the structure of a transmitting portion of the fourth embodiment of a spread spectrum communication system of the present invention.

FIG. 15 shows the structure of a transmitting portion. In FIG. 15, the PN code sequence for spreading the spectrum is stored in a shift register REG1. A PN code sequence is outputted from the final stage of the shift register and inputted to a polarity controlling portion PC(n+1). In the polarity controlling portion PC(n+1), the polarity is controlled by bit DPm of the transmission data, such that the PN code sequence is outputted as it is, or its inversion is outputted, as the component I.

Each stage of the shift register REG1 is connected to a multiplexer MUX30. The first controlling signal CTRL11 controls the multiplexer MUX30, and R of the phase-shifted PN code sequences stored in the shift register REG1 are selected and passed. In FIG. 15, sequence PN1 is outputted from the final stage, and PN2, . . ., PNn with phase-offset are successively outputted toward the first stage.

Each of the R PN code sequences passed through MUX30 are inputted to polarity controlling circuits PC1 to PCR. The second controlling signal CTRL12 is also inputted to each polarity controlling circuit PC1 to PCR. The polarities of the PN code sequences passed through MUX30 are controlled by a second control signal CTRL12. The structures of the polarity controlling circuits PC1 to PCR are the same, including inverting circuits NOT1 to NOTR and multiplexers MUX1 to MUXR. In the polarity controlling circuits PC1 to PCR, the inputs of inverting circuits NOT1 to NOTR (PN code sequences before inversion) and their outputs (PN code sequences after inversion) are inputted to MUX1 to MUXR. For example, an input and output of a inverting circuit NOT11 is inputted to the multiplexer MUX11, and the PN code to be outputted is controlled by the second control signal CTRL12.

A polarity controlling circuit PC(n+1), which receives an output from the final stage of the shift register REG1, comprises an inverting circuit NOTn+1 and a multiplexer MUXn+1 to which an input and an output of the inverting circuit NOTn+1 are inputted. The switch of the multiplexer MUXn+1 is controlled according to the signal DPm. The PN code sequence or its inversion which is inputted to MUXn+1 is outputted as a component I. The second control signal CTRL12 is inputted to each of the multiplexers MUX1 to MUXR as a select input. The outputs of MUX1 to MUXR are inputted to an addition circuit ADD1. All the outputs are added by the addition circuit ADD1 and outputted as a component Q.

The component Q comprises layers of the predetermined number R of the PN code sequences. In the present invention, the transmission data is transmitted as a combination of a plurality of PN code sequences successively shifted in phase, and each PN code sequence is inverted or not inverted.

Figure 16:
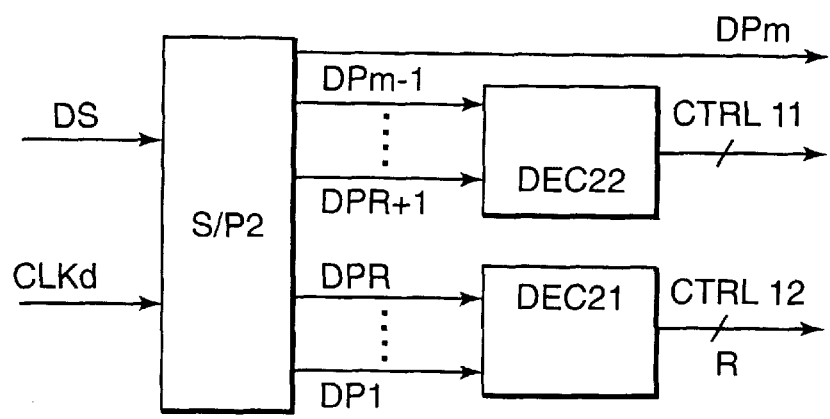
FIG. 16 is a block diagram of the structure of a transmitting portion for generating a control signal of the fourth embodiment of a spread spectrum communication system of the present invention.

The structure for generating the first control signal CTRL11, the second control signal CTRL12 and the signal DPm from the transmitting data is shown in FIG. 16.

In FIG. 16, serial data DS to be transmitted is converted into m-bit, one-block parallel data DP1 to DPm by serial/parallel converting circuit S/P2 synchronously to the predetermined data clock CLKd. R bits of data DP1 to DPR are inputted to decoder DEC21, the second control signal CTRL12 is generated, (m-R-1) bits (DPR+1) to (DPm-1) are inputted to a decoder DEC22, and the first control signal CTRL11 is generated. The bit DPm is inputted to a multiplexer MUXn+1 as the third control signal.

In this case, for example, assuming that the number of chips n of the PN code sequences is 16, the number of bits of parallel data m is 9, and the number R of the PN code sequences selected by the multiplexer MUX30 is 2, then the serial data DS for transferring is converted into parallel data by every 9 bits, component I is inverted by the uppermost bit DPm, the next upper 6 bits are inputted to the decoder DEC22 and the first control signal CTRL11 is generated, and PN code sequences pass through two of the outputs of multiplexer MUX30. Also, the inversion or non-inversion of the PN code sequences passed through MUX30 is controlled by the second control signal CTRL12, which is generated by inputting the lowest 2 bits to a decoder DEC21.

Here formula (12) is defined as follows.

$$6 < \log_2(_{16}C_2) < 7 \tag{12}$$

Thus we can express the 6-bit transmitting data DP3 through DP8 by combining two PN code sequences of 16 chips. The control of inversion or non-inversion of the polarities of the two selected PN code sequences is controlled by applying the lower two bits of data to each PN code sequence via CTRL12.

Figure 17:
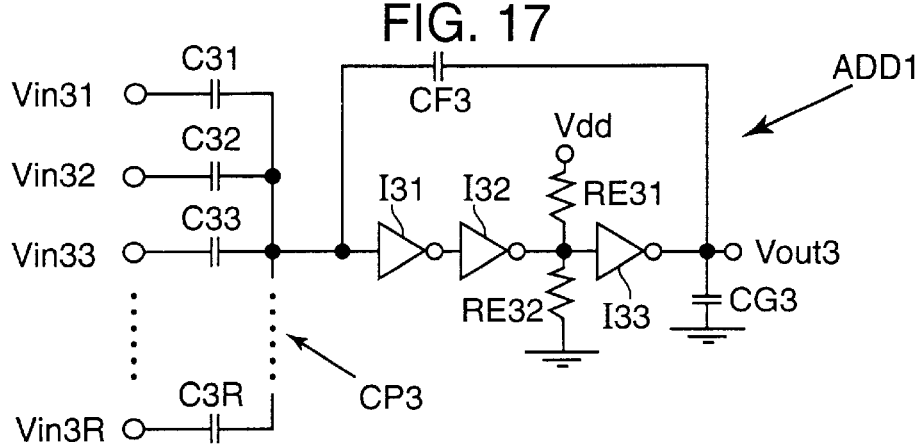
FIG. 17 is a block diagram of the structure of an addition circuit in the transmitting portion of the fourth embodiment.

In FIG. 17, the exemplary structure of an addition circuit ADD1 is shown. In this figure, outputs from multiplexers MUX1 to MUXR are the input voltages Vin31 to Vin3R, which are integrated by a capacitive coupling CP3 consisting of capacitances C31 to C3R. An output of the capacitive coupling CP3 is inputted to an inverted amplifying circuit that includes three steps of MOS inverters I31, I32 and I33. An output of the inverter I33 is fed back to an input of the inverter I31 through a feedback capacitance CF3.

The inverted amplifying circuit has sufficiently high open-loop gain to work as a calculation amplifier. Therefore, an output Vout3 shown in formula (13) is outputted from the inverter I33 with high linearity by the feedback system formed by the inverted amplifying circuit.

$$Vout3 = Vdd - \frac{\sum_{i=1}^{R} V3i \cdot C3i}{CF3} \tag{13}$$

In this formula, the C3i are defined as follows.

$$C31 = C32 = \ldots = C3R = CF3/R \tag{14}$$

Therefore, formula (13) can be transformed into formula (15).

$$Vout3 = Vdd - \frac{1}{R}\sum_{i=1}^{R} Vin3i \tag{15}$$

The addition circuit ADD1 outputs voltage corresponding to the result of adding Vin31 through Vin3R. The output is transmitted from the transmitting portion after appropriate inversion, scaling, and so on. When digital processing is performed in the transmitting portion, a digital output can be generated by constructing the addition circuit ADD1 with a well-known digital circuit.

Figure 27:
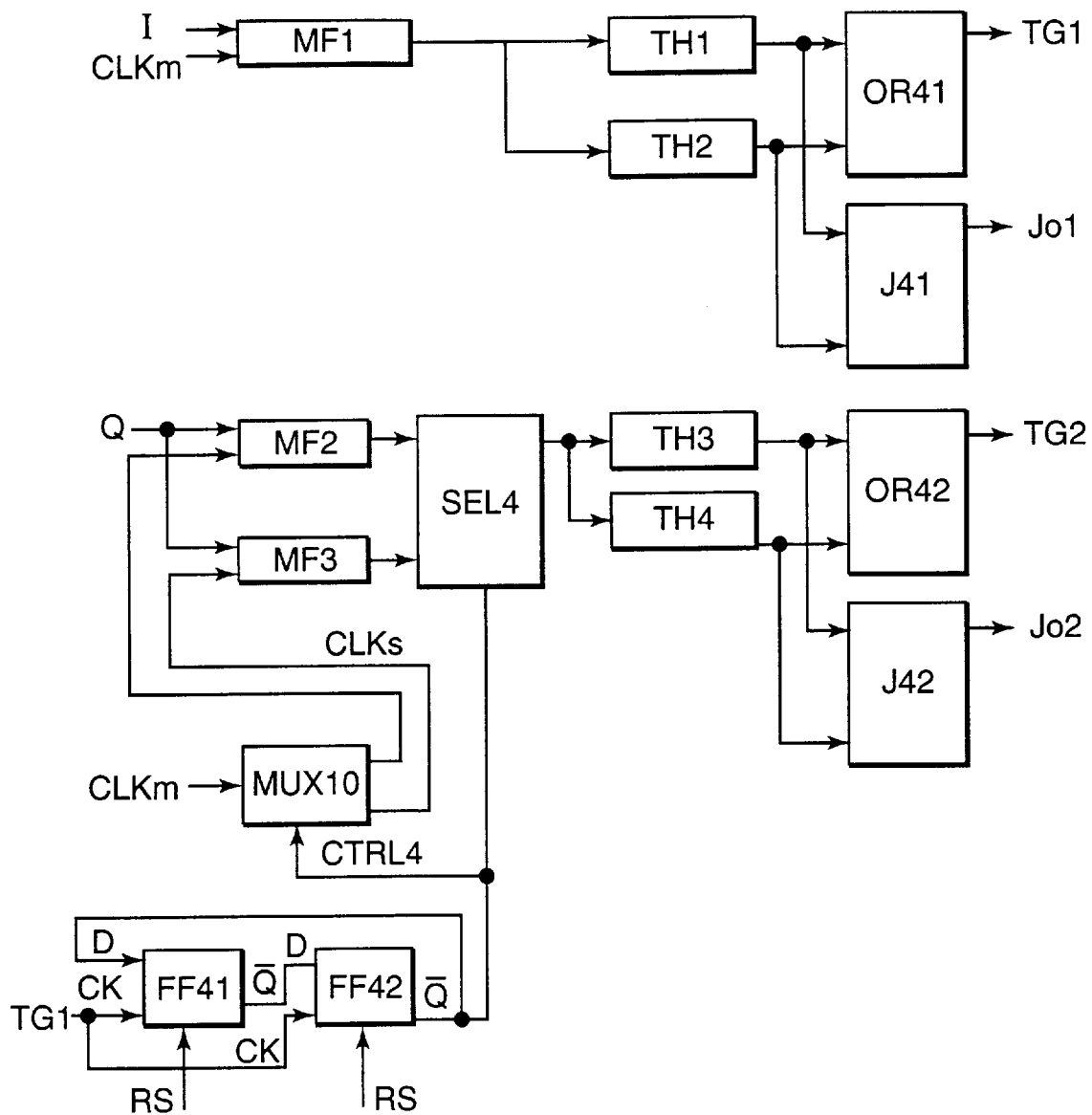
FIG. 27 is a block diagram of a receiving system used in the fourth embodiment of the present invention.

FIG. 27 shows the structure for decoding a PN code sequence in a receiving portion of the form of the fourth embodiment of the SS communication system according to the present invention. In FIG. 27, a signal transmitted by QAM is demodulated by a receiving portion not shown, and divided components I and Q are outputted by the receiving portion. The component I is inputted to the matched filter MF1, and the component Q is inputted to the matched filters MF2 and MF3.

A PN code sequence the same as that in the component I in the transmitting portion is settled as a multiplier in the matched filter MF1. When an input signal of the component I and the multiplier of the matched filter MF1 are coordinated, the matched filter MF1 generates a correlation peak. An output of the matched filter MF1 is inputted to peak detecting circuits TH1 and TH2. A positive (non-inverted) peak is detected by the peak detecting circuit TH1 and a negative (inverted) peak is detected by the peak detecting circuit TH2.

Outputs of peak detecting circuits TH1 and TH2 are inputted to OR circuit OR41. The first trigger signal TG1 is generated when TH1 or TH2 detects a peak. Outputs of TH1 and TH2 are also inputted to the first judgment circuit J41. When the peak detecting circuit TH2 does not detect any peak and the peak detecting circuit TH1 detects a peak, the first judging circuit J41 generates the first judging signal Jo1 of low level. When TH1 does not detect a peak and TH2 detects a peak, the first judging circuit J41 generates the first judging signal Jo1 of high level. The first judging signal Jo1 corresponds to the transmitted data bit DPm, and becomes a decoded data of bit DPm.

Data of the component Q is inputted to one of the matched filters MF2 and MF3. The inputting of the component Q is stopped when the OR circuit OR41 outputs the first trigger signal TG1, and inputting of the component Q to the other matched filter (MF3 or MF2) is started. In the matched filter in which the inputting of the component Q was stopped, the PN code sequence is circulated and a correlation peak signal is outputted when the correlation is valid. In this case, as a plurality of PN code sequences is combined and transmitted from the transmitting portion, a plurality of correlation peak signals is obtained by the matched filter calculating correlation.

The clock CLKm for providing timing for the inputting of data is inputted to the multiplexer MUX10. A clock CLKs generated from the clock CLKm is alternately inputted to the matched filters MF2 and MF3.

Switching is performed by flip-flops FF41 and FF42 and the multiplexer MUX10. The clock CLKm is inputted to MUX10 and the clock CLKs is inputted to one of the matched filters MF2 and MF3 from MUX10, in which a control signal CTRL4 is the select signal.

One of the matched filters MF2 and MF3 inputs the data of the component Q by the clock CLKs. The component Q is the one already inputted to one of MF2 and MF3. The multiplexer MUX10 is switched by the control signal CTRL4, which is inverted by two stages of flip-flops FF41 and FF42 on every pulse of the trigger signal TG1.

With respect to the flip-flop FF41, the trigger signal TG1 is inputted to a clock input (CK) terminal, and an inverted output ($\overline{Q}$) of the flip-flop FF42 is inputted to the data input (D) terminal. With respect to the flip-flop FF42, an inverted output ($\overline{Q}$) of the flip-flop FF41 is inputted to a data input (D) terminal, and the first trigger signal TG1 is inputted to a clock input (CK) terminal. Consequently, an output of the flip-flop FF42 is alternately high level and low level at every pulse of the first trigger signal TG1.

By the structure above, when a pulse appears on the first trigger signal TG1, the multiplexer MUX10 is switched so that the matched filter MF3 receives the clock CLKs, assuming that the clock CLKs has been inputted to the matched filter MF2 until then. After that, the data inputted to the matched filter MF2 is held as it is, and the PN code sequence in the matched filter MF2 is circulated.

A selector SEL4, which is controlled by a control signal CTRL4, is switched to the side of the matched filter MF2 on a pulse of the first trigger signal TG1. An output of SEL4 is inputted to the peak detecting circuits TH3 and TH4, and a pulse on the second trigger signal TG2 is outputted when TH3 (for detecting a positive peak) or TH4 (for detecting a negative peak) detects a peak. Specifically, the second trigger signal TG2 is outputted from an OR circuit OR42 to which outputs of peak detecting circuits TH3 and TH4 are inputted.

Outputs of the peak detecting circuits TH3 and TH4 are also inputted to the second judging circuit J42 which judges that a positive peak is detected when the peak detecting circuit TH3 detects a peak and the peak detecting circuit TH4 does not detect any peak. When TH3 does not detect any peak and TH4 detects a peak, the second judging circuit J42 judges that a negative peak is detected. In this case, the second judging signal Jo2 of the J42 is low level when a negative peak is detected, and it remains at high level when a positive peak is detected.

Figure 18:
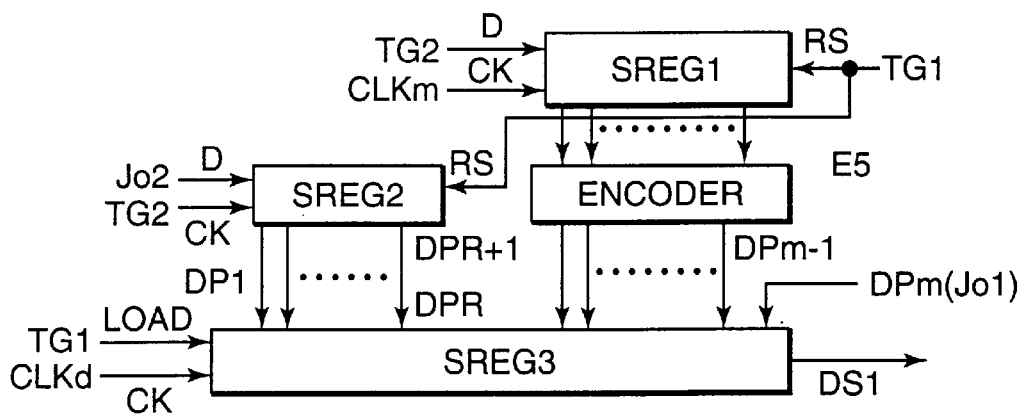
FIG. 18 is a block diagram of the structure of the receiving portion for converting the coding data into the serial data of the fourth embodiment.

FIG. 18 shows the structure for obtaining a decoded serial data from the first trigger signal TG1, the first judging signal Jo1, the second trigger signal TG2, and the second judging signal Jo2.

In FIG. 18, the second trigger signal TG2 is inputted to a data input (D) terminal of a shift register SREG1, and the clock CLKm is inputted to the clock input (CK) terminal of SREG1. The first trigger signal TG1 is inputted to a reset input (RS) of SREG1. When a pulse appears on TG1, SREG1 is reset, and pulses appearing on the second trigger signal TG2 are successively written into SREG1 synchronously to the clock CLKm.

As the second trigger signal TG2 is high level only when one of the peak detectors TH2 or TH3 detects a peak, data bits including R number of "1" bits per n bits are written to the shift register SREG1.

The output of SREG1 is inputted to an encoder E5. Bits DPR+1 to DPm-1 are decoded by the encoder E5 via an inverse of the processing operation performed by the decoder DEC22 in FIG. 16.

As mentioned above, the data bit DPm is decoded from the first judging signal Jo1. The second judging signal Jo2 is connected to a data input (D) terminal of SREG2, and the second trigger signal TG2 is inputted to the clock input (CK) terminal. The first trigger signal TG1 is inputted to a reset input (RS) of SREG2. That is, shift register SREG2 is reset when a pulse of the first trigger signal TG1 is inputted to SREG2. Then every time a pulse of TG2 is inputted to SREG2, outputs of the second judging signal Jo2 are successively written to SREG2. Therefore, an R-bit string of binary data from DP1 to DPR (i.e. the lower R bits) is decoded by SREG2. Outputs of the encoder E5 and the shift register SREG2 and the first judging signal Jo1 are inputted to a shift register SREG3 as a series of bit strings. As the data are defined by a cycle of PN code sequence, that is, by every generation cycle of the first trigger signal TG1, the above data are inputted to SREG3 on the timing of pulses of the first trigger signal TG1 by inputting the first trigger signal TG1 to a data load controlling terminal (LOAD) of SREG3.

As a data clock CLKd is always inputted to SREG3, the transmission signals DP1 to DPm are serially outputted by SREG3 on every pulse of the data clock CLKd, and the data decoded from the transmission signals can thus be obtained.

Figure 19:
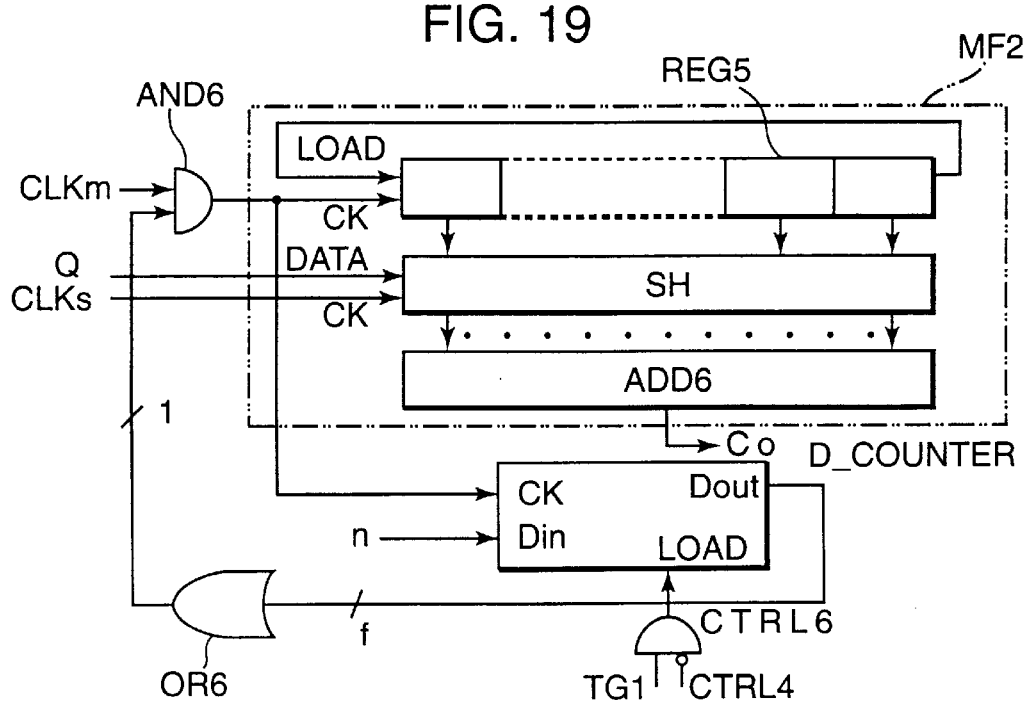
FIG. 19 is a block diagram of the structure of the matched filter in the receiving portion of the fourth embodiment.

FIG. 19 shows an example of the structure of the matched filters MF2 and MF3.

A control signal CTRL6 of the logical multiplication (AND logic) of the first trigger signal TG1 and the inversion of a control signal CTRL4 is inputted to a data load controlling input terminal (LOAD) of a down counter (shown by D_COUNTER), and the number of chips of one cycle n of the PN code sequence inputted to a data input terminal (Din) is loaded into the D_COUNTER. An f-bit binary output of the D_COUNTER is inputted to an AND gate AND6 after all the logical sums are performed by an OR gate OR6, and the logical multiplication with the clock CLKm is performed.

Therefore, AND6 is opened when the count value of the D_COUNTER is 1 or more, and the clock CLKm passes through AND6. AND6 is opened only in the period that MF2 does not perform sampling and the D_COUNTER counts n number of pulses on CLKm.

The f is the number of bits corresponding to the number of chips n, and has the following value:

$$\log_2 n < f \leq \log_2 n + 1 \tag{16}$$

The second trigger signal TG2 is generated after the sample-and-hold circuit SH has finished sampling, when gate AND6 is opened and the PN code sequence stored in the shift register REG6 is circulated once. The data held in SH is multiplied with the PN code sequence in REG6 whenever the contents of REG6 are shifted. The multiplied data are added by addition circuit ADD6 and a correlation output CO is generated.

When n number of pulses of clock CLKm are inputted to D_COUNTER after a pulse on the first trigger signal TG1 is outputted, the counted value of the D_COUNTER is 0, and AND6 is closed to prepare for the next correlation calculation.

As the matched filter circulating PN code sequences cannot receive a component Q of new data, the component Q is inputted by stopping the supply of the clock CLKs and supplying CLKs to the other matched filter (MF2 or MF3).

Figure 20:
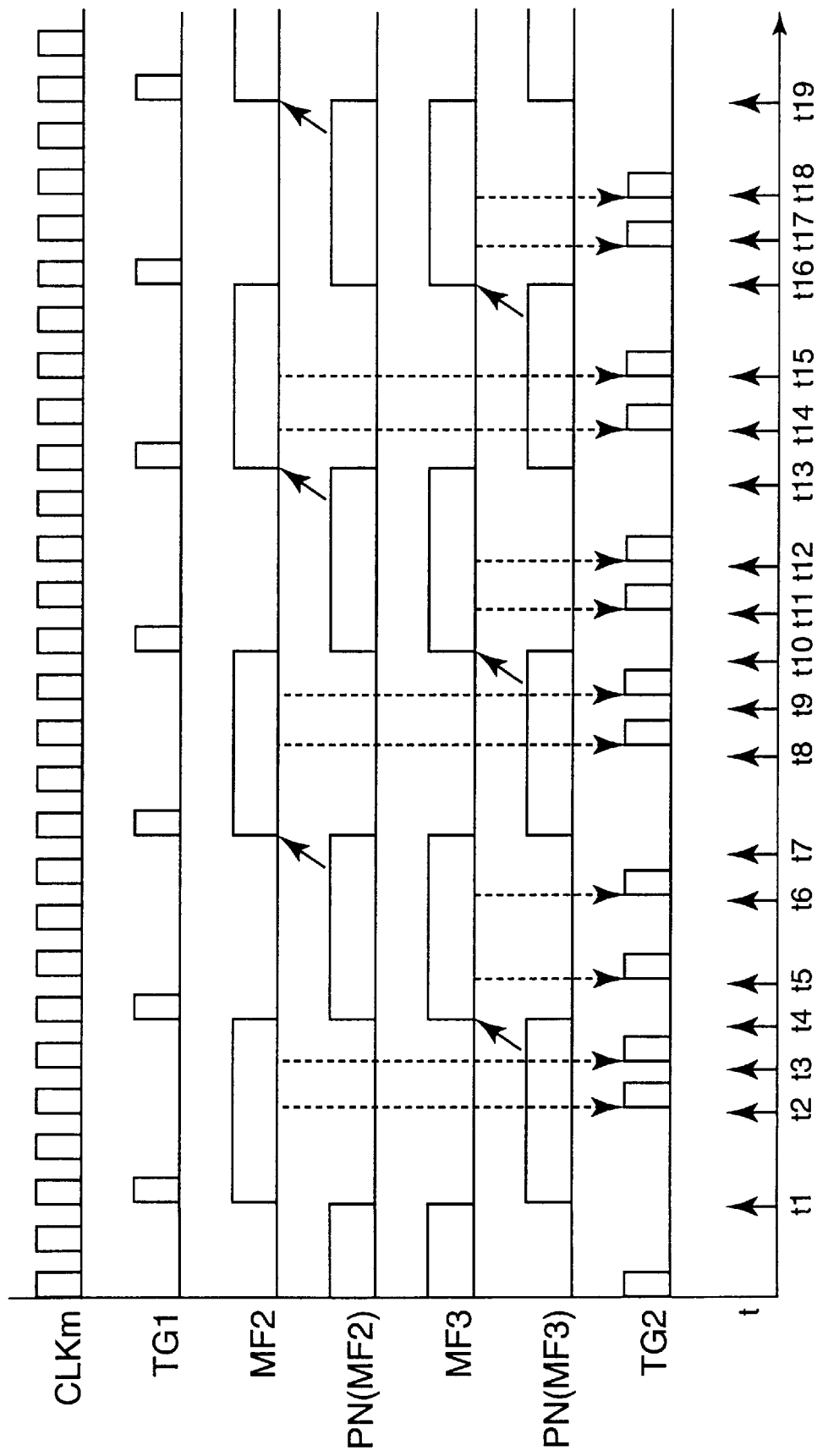
FIG. 20 is a timing chart of the receiving portion of the fourth embodiment.

FIG. 20 shows the timing of the actions of the matched filters MF2 and MF3 which work as above.

As shown in the figure, the PN code sequence stored in the matched filter MF2 is circulated and a correlation is calculated when a pulse appears on the first trigger signal TG1 at time t1. Consequently, correlation outputs are obtained at times t2 and t3. The second trigger signal TG2 is generated by these correlation outputs. In this period, the data received during one cycle of the PN code sequence are inputted to the matched filter MF3. When a pulse appears on TG1 again at time t4, the PN code sequence in the matched filter MF3 is circulated and a correlation is calculated. Consequently, correlation outputs can be obtained at times t5 and t6. The second trigger signal TG2 is generated by these correlation outputs.

The second trigger signal TG2 as shown in the figures can be obtained by repeating the actions above in the matched filters MF2 and MF3.

Figure 21:
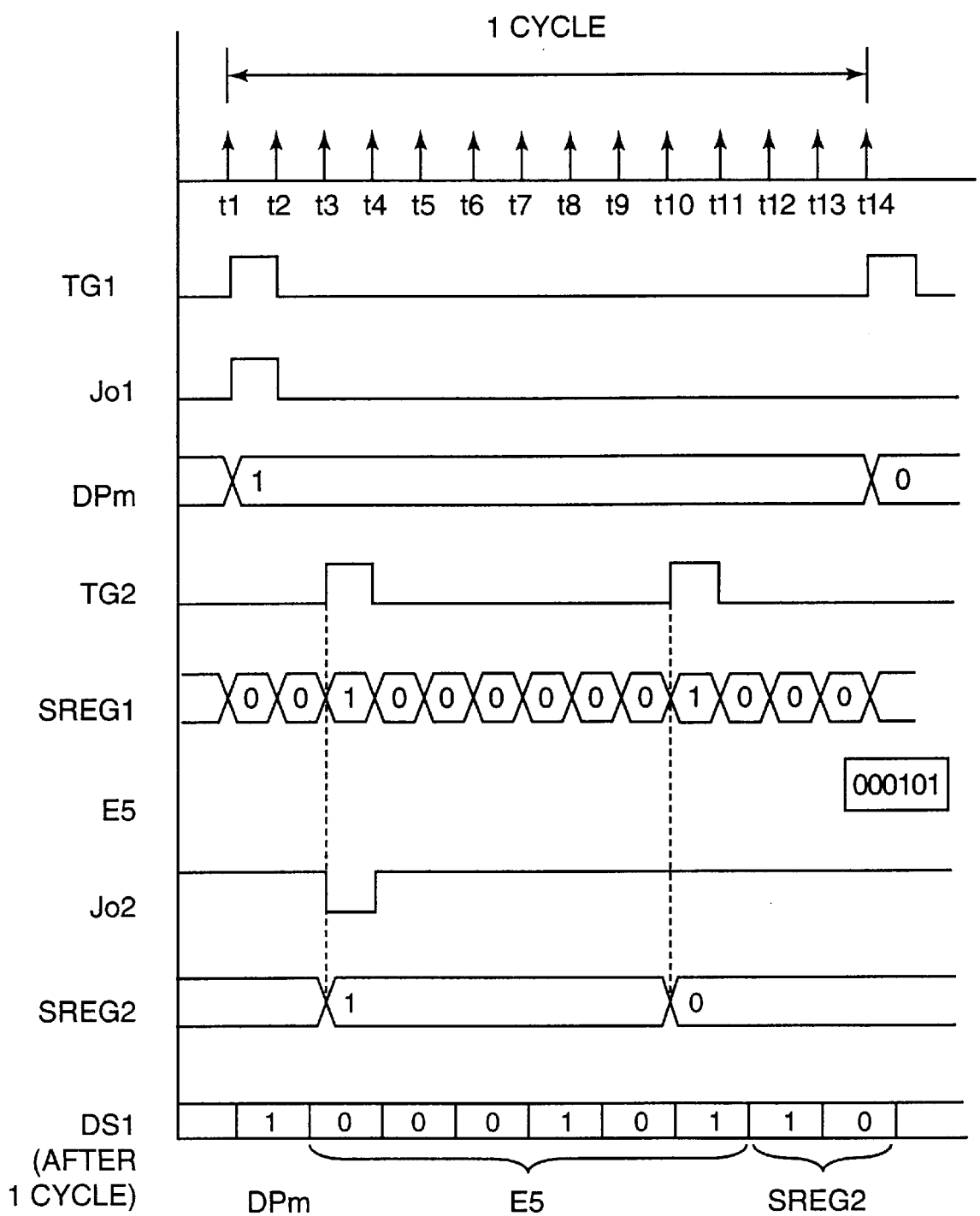
FIG. 21 is an exemplary timing chart showing more detail than FIG. 20.

Taking FIG. 21 as an example, the above is described in more detail. In this example, it is assumed that one cycle of PN code sequence is 13 chips and R is 2, that is, the component Q is the sum of two of PN code sequences shifted in phase.

The first trigger signal TG1 is generated by 13 chips, and the first judging signal Jo1 is generated so as to show the polarity of the peak synchronous to the first trigger signal TG1. Data bit DPm is generated as shown by the first judging signal Jo1.

As two offset PN code sequences are included in the Q component, when the correlation of the component Q is calculated, two pulses are generated in one cycle of the second trigger signal TG2 as shown. When the second trigger signal TG2 is inputted to the shift register SREG1, the contents of SREG1 are "0010000001000" as shown. When the data stored in SREG1 is inputted to the encoder E5, a 6-bit string "000101" is assumed to be decoded, for example. The decoded data is serially outputted from the encoder E5.

When the second judging signal Jo2 which is synchronous to the second trigger signal TG2 is generated, data "10" is inputted to the shift register SREG2 as shown.

The outputs of E5 and SREG2 and the signal DPm are loaded into the shift register SREG3, and 9 bits of serial data DS1 shifted and decoded according to the data clock CLKd are obtained. In this case, with respect to the 9 bits of serial data DS1, the first bit is the signal DPm, the next 6 bits are the output of the encoder E5, and the last 2 bits are the outputs of the shift register SREG2.

As above, when the data is transmitted by the phase difference between the components I and Q, and inversion and non-inversion of the peaks, the information rate Rn of n chip (1 chip time is "Tc") is $$Rn = \log_2(2^{R+1} \cdot {}_nC_R)/n \cdot Tc \tag{17}$$

In formula (17), R is the number of peaks of the component Q, that is, the number of phase-shifted PN codes transmitted.

The information rate Rq in the case that each of the I and Q channels transmits 1 bit of information by conventional n chips is expressed in formula (2). The ratio of the two rates (information rate ratio, hereinafter) is as in formula (18).

$$Rn/Rq = \log_2(2^{R+1} \cdot {}_nC_R)/2 \tag{18}$$

With respect to formula (17), the number of chips n and the information rate ratio Rn/Rq is shown in FIG. 22. The quantity of the information is improved several times over the conventional one, which means that the speed of communication is improved.

In the above embodiments, an information is transmitted and received under the condition that the number of peaks of the component Q is constant. However, it is also possible to change R. In the embodiment of such a condition, an information can be transmitted and received by a circuit of similar structure. This is the fifth embodiment which is described below.

For example, it is assumed that the number of chips n is 16, the number of bits of one block to transmit m is 10, and R (the number of peaks of the component Q) is either 1 or 2. R is equal to 1 when the binary value of data block p is from "0" to "111111", and in this case the inversion or non-inversion of the component I is defined by the MSB of the data block, the inversion or non-inversion of the peak is defined by the LSB of the data block, and the location of the peak (16 ways) is defined by the remaining 4 bits.

When p is greater than "1111111"(that is, when p is from "0001000000" to "1111111111"), then R=2, the inversion or non-inversion of the component I is defined by the MSB of a data block, and the inversion or non-inversion of the peaks is defined by the lower 2 bits of the data block. The transmissible information Ifn under such a condition is expressed in formula (19).

$$Ifn = \log_2(2^3 \times {}_{16}C_2 + 2^2 \times {}_{16}C_1) \geq 10 \tag{19}$$

Thus it is possible to transmit the 10 bits of information by one cycle of PN code sequences.

Figure 24:
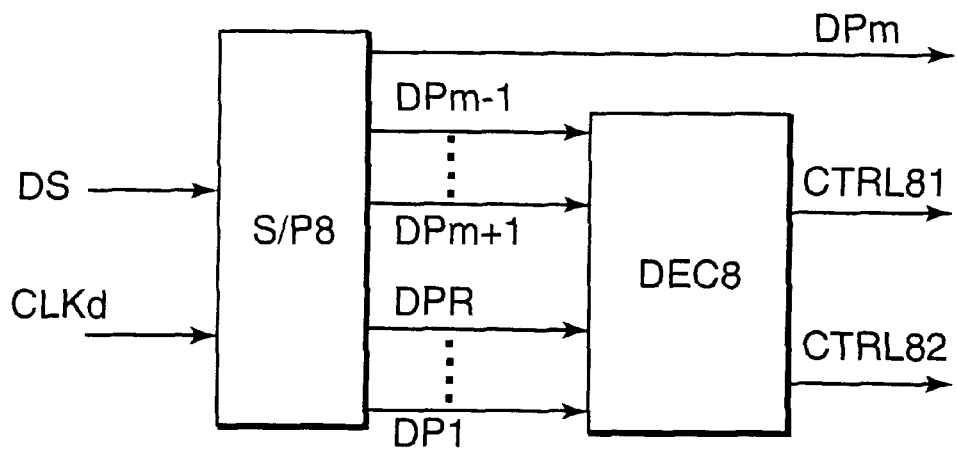
FIG. 24 is a block diagram of the structure of the control signal generation portion in the transmitting portion of the fifth embodiment.
Figure 25:
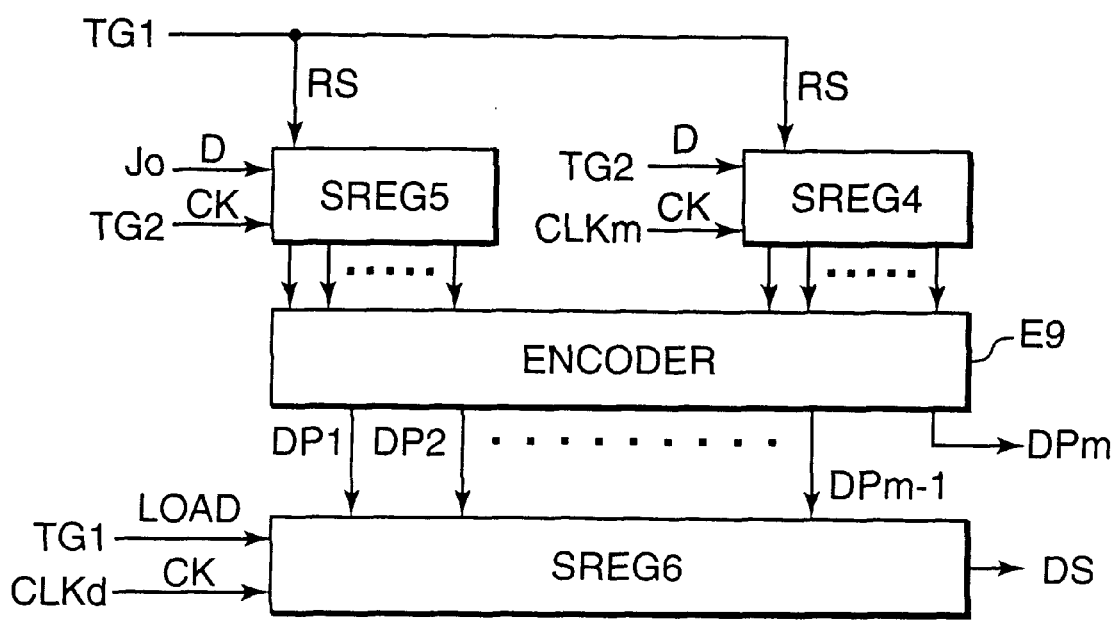
FIG. 25 is a block diagram of the structure for converting the coded data into the serial data in the receiving portion of the fifth embodiment.
Figure 26:
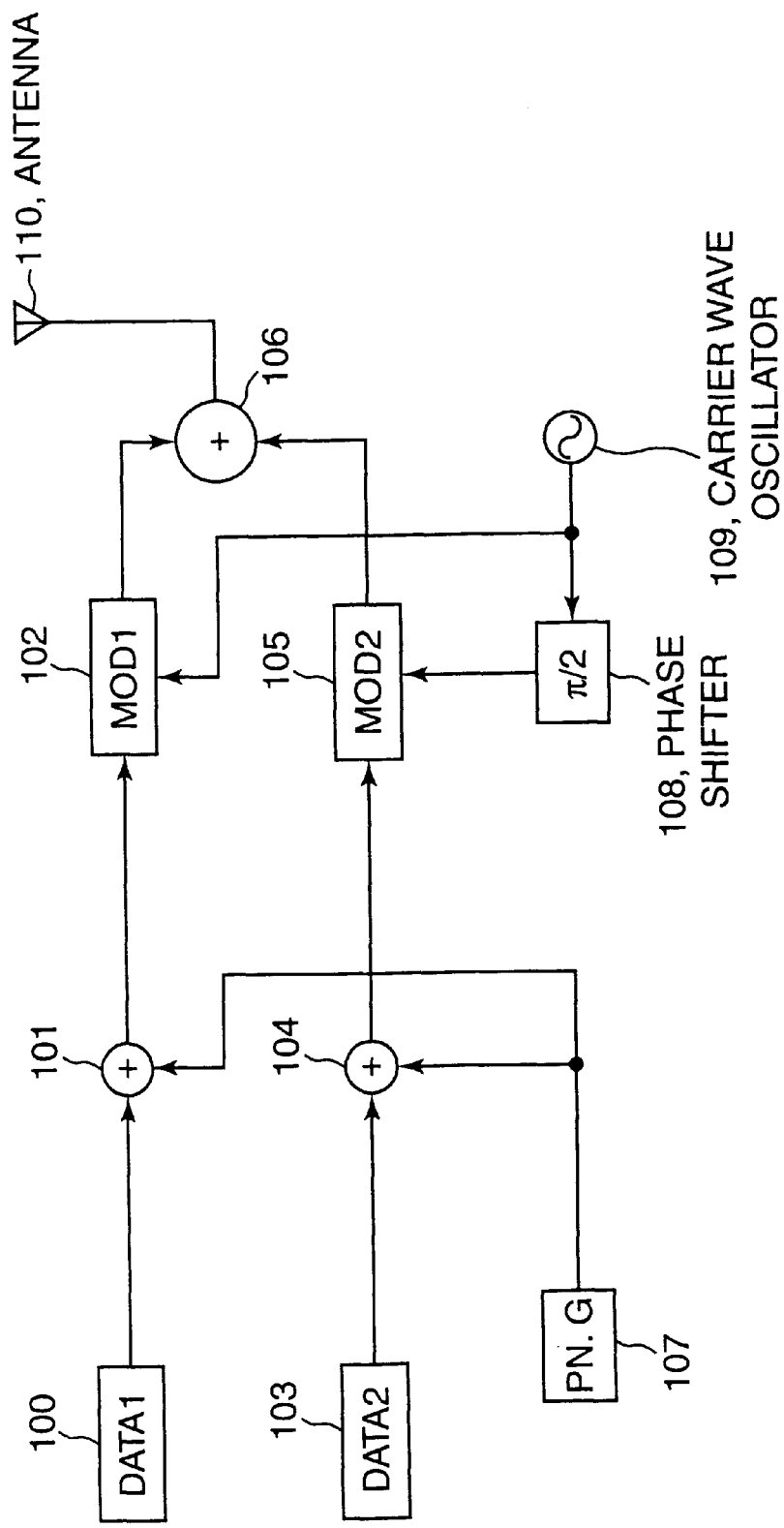
FIG. 26 is a block diagram of the structure of a conventional spread spectrum communication system.

FIGS. 24 and 25 show the structures of the decoder and encoder for realizing the fifth embodiment. In FIG. 24, the serial data DS to be transmitted is converted into an m-bit block of parallel data DP1 to DPm by serial/parallel converting circuit S/P8 synchronously to the data clock CLKd. One bit DPm of the parallel data controls the inversion of the component I, and the other (m-1) bits of data are converted into the first control signal CTRL81 and the second control signal CTRL82 by a decoder DEC8.

The first control signal CTRL81 is used to open and close a gate for passing through the phase-shifted PN code sequences similarly to the first control signal CTRL11 in FIG. 15. The second control signal CTRL82 is used to control the polarity controlling portions PC1 to PCn similarly to the second control signal CTRL12 in FIG. 15.

On the receiver side, as shown in FIG. 25, the second trigger signal TG2 is received synchronously to a clock CLKm by a shift register SREG4, and a judging signal Jo is received synchronously to the clock of the second trigger signal TG2 by a shift register SREG5 so as to generate a bit string to show the inversion or non-inversion of peaks, the number of peaks, and the locations of the peaks. The data in SREG4 and SREG5 are inputted to an encoder E9 and converted into the transmitted block of parallel data DP1 to DPm. The parallel data DP1 to DPm are received by a shift register SREG6 synchronously to the first trigger signal TG1, and are then outputted as serial data DS synchronously to a data clock CLKd.

Generally, when the number of peaks is from 0 to R, the information rate is expressed by formula (20) assuming one chip time to be Tc.

$$Rq = \frac{\log_2\left\{\sum_{i=0}^{R}(2^{i+1}x_nC_i)\right\}}{n \cdot Tc} \quad (20)$$

Therefore, the information rate ratio Rn/Rq is as in formula (21).

$$\frac{Rn}{Rq} = \frac{\log_2\left\{\sum_{i=0}^{R}(2^{i+1}x_nC_i)\right\}}{2} \quad (21)$$

FIG. 23 shows the example of the information rate ratio Rn/Rq when the number of peaks R of the component Q is 4.

As mentioned above, a spread spectrum communication system according to the present invention expresses the data to be sent by the phase difference between the first and the second components. Therefore, it is possible to heighten the speed of communication as compared to that of a conventional system.

Also, the present invention transfers the first PN code sequence itself as the first component, transmits an integrated signal of zero or more instances of the second PN code sequence with phase differences as the second component, and defines an information for transmitting by the number of the second PN codes corresponding to a cycle of the first PN code sequence. Therefore, it is possible to increase the speed of communication as compared to that of a conventional system.

Further, in the spread spectrum communication system with two components according to the present invention, the first component consists of the first PN code sequence and the second component consists of an addition of a plurality of PN code sequences shifted in-phase. An information is defined by shifted phases of the PN code sequences of the second component in comparison to the first component.

Therefore, it is possible to improve the capacity and speed of the data transmission.

What is claimed is:

1. A spread spectrum communication system comprising:
   a transmitter for outputting data, including a first PN code sequence as a first component and a second PN code sequence shifted in phase from the first PN code sequence as a second component, so that information to be transmitted is defined by a phase difference between the first and second PN code sequences; and
   a receiver for receiving the data, including
      a first matched filter having a PN code sequence corresponding to the first PN code sequence for outputting a first peak when the first PN code sequence is received by said receiver, and
      two second matched filters having a PN code sequence corresponding to the second PN code sequence for alternatingly receiving at least a portion of the data and outputting a second peak when the second PN code sequence is received,
      wherein said two second matched filters each perform a different one of receiving at least a portion of the data and circulating the PN code sequence corresponding to the second PN code sequence, respectively,
      and wherein when said first matched filter outputs the first peak, said two second matched filters switch functions of circulating the PN code sequence corresponding to the second PN code sequence and receiving at least a portion of the data.

2. The spread spectrum communication system as claimed in claim 1,
   wherein one of the first and second components is an in-phase component and the other of the first and second components is a quadrature component.

3. The spread spectrum communication system as claimed in claim 1,
   wherein the first and second components are carried by different carrier waves.

4. A spread spectrum communication system comprising a transmitter which transmits
   (A) a first PN code sequence as a first component and
   (B) an integrated signal of a predetermined number of second PN code sequences successively shifted as a second component,
   wherein said predetermined number is an integer greater than zero, and
   wherein an information to be transmitted is represented by said predetermined number.

5. The spectrum communication system as claimed in claim 4, wherein said first and second components are orthogonal to each other and carried by the same carrier wave.

6. A spread spectrum communication system comprising a transmitter which multiplexes
   (A) a first PN code sequence and
   (B) a second PN code sequence having the same cycle as said first PN code sequence,
   wherein said second PN code sequence is generated by adding a predetermined number of basic PN code sequences shifted in phase, and
   wherein said predetermined number is greater than zero, and wherein an information to be transmitted is represented at least in part by phase shifts of said predetermined number of basic PN code sequences with respect to said first PN code sequence.

7. The spread spectrum communication system as claimed in claim 6, wherein a polarity of said first PN code sequence is determined according to a predetermined bit of an information to be transmitted.

8. The spread spectrum communication system as claimed in claim 6, wherein a polarity of each basic PN code sequence of said second PN code sequence is determined according to a plurality of predetermined bits of information to be transmitted.

9. The spread spectrum communication system as claimed in claim 6, wherein said first and second PN code sequences are generated by a single PN code generating means.

10. The spread spectrum communication system as claimed in claim 6, wherein said multiplexing is quadratically multiplexed using QAM modulation.

11. The spread spectrum communication system as claimed in claim 6, wherein each of said first and second PN code sequences are transmitted by carrier waves different from each other.

12. The spread spectrum communication system as in claim 1, wherein one of the first and second components is occasionally inverted so as to define an information of one bit.

13. The spread spectrum communication system as in claim 1, wherein the first and second PN code sequences are the same.

14. The spread spectrum communication system as in claim 2, wherein one of the first and second components is occasionally inverted so as to define an information of one bit.

15. The spread spectrum communication system as in claim 2, wherein the first and second PN code sequences are the same.

16. The spread spectrum communication system as in claim 3, wherein one of the first and second components is occasionally inverted so as to define an information of one bit.

17. The spread spectrum communication system as in claim 3, wherein the first and second PN code sequences are the same.

18. The spread spectrum communication system as in claim 1, wherein one of the first and second components is an in-phase component and the other component is a quadrature component.

19. The spread spectrum communication system as in claim 1, wherein the first and second components are components of other channels carried by different carrier waves.

20. A spread spectrum communication system comprising a transmitter which transmits (A) a first PN code sequence as a first component and (B) an integrated signal of a predetermined number of second PN code sequences successively shifted in phase as a second component, wherein said predetermined number is greater than zero, and wherein an information to be transmitted is represented at least in part by phase shifts of said predetermined number of second PN code sequences.

* * * * *